(12) United States Patent
Li et al.

(10) Patent No.: US 11,864,019 B2
(45) Date of Patent: Jan. 2, 2024

(54) TIME-SENSITIVE NETWORKING COMMUNICATION METHOD AND APPARATUS

(71) Applicant: Huawei Technologies Co., Ltd., Shenzhen (CN)

(72) Inventors: Hancheng Li, Shanghai (CN); Han Zhou, Shanghai (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 282 days.

(21) Appl. No.: 17/323,295

(22) Filed: May 18, 2021

(65) Prior Publication Data

US 2021/0274375 A1    Sep. 2, 2021

Related U.S. Application Data

(63) Continuation of application No. PCT/CN2019/119510, filed on Nov. 19, 2019.

(30) Foreign Application Priority Data

Nov. 19, 2018  (CN) .......................... 201811378042.3

(51) Int. Cl.
*H04L 47/00* (2022.01)
*H04W 28/02* (2009.01)
(Continued)

(52) U.S. Cl.
CPC ......... *H04W 28/0268* (2013.01); *H04L 47/20* (2013.01); *H04L 47/28* (2013.01);
(Continued)

(58) Field of Classification Search
None
See application file for complete search history.

(56) References Cited

U.S. PATENT DOCUMENTS 11,632,810 B2 * 4/2023 Sivasiva Ganesan ...................... H04W 28/0268 370/329
2017/0272366 A1 9/2017 Bush et al.
(Continued)

FOREIGN PATENT DOCUMENTS

CN        108293072 A       7/2018
WO    WO-2020005208 A1 *  1/2020 ............. H04L 45/24
(Continued)

OTHER PUBLICATIONS

Huawei et al., "QoS Negotiation between 3GPP and TSN networks KI#3.1",SA WG2 Meeting #129, S2-1811211, Oct. 15-19, 2018, 9 pages.
Nokia et al., "Integration of the 5G System in a TSN network," SA WG2 Meeting #128-Bis, S2-18xxxx (S2-188100), Aug. 20-24, 2018, Sophia Antipolis, 7 pages.
(Continued)

*Primary Examiner* — Ajit Patel
(74) *Attorney, Agent, or Firm* — Conley Rose, P.C.

(57) ABSTRACT

A time-sensitive networking communication method and an apparatus, where the method may include: receiving, by a policy control network element, forwarding policy information of time sensitive networking (TSN) traffic; triggering the policy control network element to manage a quality of service (QoS) flow corresponding to the TSN traffic; determining a user terminal corresponding to the TSN traffic; determining, in a QoS flow corresponding to the user terminal, the QoS flow corresponding to the TSN traffic; creating or updating, according to the forwarding policy information, a QoS policy of the QoS flow corresponding to the TSN traffic; and sending the QoS policy to a session management network element, where the forwarding policy information includes traffic information of the TSN traffic and an identifier of a port that transmits the TSN traffic.

20 Claims, 13 Drawing Sheets

(51) Int. Cl.
*H04L 47/20* (2022.01)
*H04L 47/28* (2022.01)
*H04L 49/00* (2022.01)
*H04W 28/10* (2009.01)
*H04W 84/04* (2009.01)

(52) U.S. Cl.
CPC ............ *H04L 49/70* (2013.01); *H04W 28/10* (2013.01); *H04W 84/042* (2013.01)

(56) References Cited

U.S. PATENT DOCUMENTS

2018/0338265 A1* 11/2018 Goel .................. H04L 45/02
2020/0322461 A1 10/2020 Gotz et al.

FOREIGN PATENT DOCUMENTS

| WO | WO-2020013874 A1 * | 1/2020 | ............ H04W 28/18 |
| WO | WO-2020034464 A1 * | 2/2020 | ............ H04J 3/0661 |
| WO | WO-2020035127 A1 * | 2/2020 | ......... H04L 41/0896 |
| WO | WO-2020035130 A1 * | 2/2020 | ......... H04L 12/1407 |
| WO | WO-2020035133 A1 * | 2/2020 | ............ H04L 12/40 |

OTHER PUBLICATIONS

3GPP TS 23.503 V15.3.0, "3rd Generation Partnership Project;Technical Specification Group Services and System Aspects; Policy and Charging Control Framework for the 5G System; Stage 2 (Release 15)," Sep. 2018, 69 pages.
Nokia, "Time Sensitive Networking," 3GPP TSG RAN WG3 #101bis, 3GPP, Oct. 12, 2018, R3-185958, 11 pages.
Huawei, "Updates on Solution #18," 3GPP TSG SA WG2 #129bis, 3GPP, Nov. 2018, S2-1812232, 10 pages.
Nokia, et al.,"TSN—QoS Framework," SA WG2 Meeting #129, S2-1810436, Oct. 15-19, 2018, Dongguan, 9 pages.
3GPP TS 23.501 V15.3.0, "3rd Generation Partnership Project; Technical Specification Group Services and System Aspects; System Architecture for the 5G System; Stage 2 (Release 15)," Sep. 2018, 226 pages.
Huawei, et al., "QoS Negotiation between 3GPP and TSN networks KI#3.1," SA WG2 Meeting #129, S2-1811021, Oct. 15-19, 2018, Dongguan, China, 9 pages.
3GPP TS 23.502 V15.3.0 "3rd Generation Partnership Project; Technical Specification Group Services and System Aspects; Procedures for the 5G System; Stage 2 (Release 15)," Sep. 2018, 329 pages.

* cited by examiner

TIME-SENSITIVE NETWORKING COMMUNICATION METHOD AND APPARATUS

CROSS-REFERENCE TO RELATED APPLICATIONS

This application is a continuation of International Patent Application No. PCT/CN2019/119510, filed on Nov. 19, 2019, which claims priority to Chinese Patent Application No. 201811378042.3, filed on Nov. 19, 2018. The disclosures of the aforementioned applications are hereby incorporated by reference in their entireties.

TECHNICAL FIELD

Embodiments of this application relate to the field of communications technologies, and specifically, to a time-sensitive networking communication method and an apparatus.

BACKGROUND

Time-sensitive networking (TSN) can help ensure real-time performance and certainty of the Ethernet, ensure reliability of data transmission of a time-sensitive service, and predict an end-to-end transmission delay. The TSN overcomes a disadvantage that the conventional Ethernet cannot provide transmission with high reliability and a guaranteed delay, and can meet requirements in fields such as vehicle control and the industrial internet. The TSN includes a switching node (bridge) and a data terminal (end station). The data terminal is configured to send or receive TSN traffic, and data terminals may be classified into a transmit end (talker) and a receive end (listener). The switching node uses a destination media access control (MAC) address of the TSN traffic as an identifier of the TSN traffic, reserves a resource based on a delay requirement of the TSN traffic, and schedules and forwards the TSN traffic according to a scheduling rule, to ensure transmission reliability and a guaranteed transmission delay, in order to implement deterministic end-to-end transmission.

To implement deterministic end-to-end transmission in a $5^{th}$ generation) (5G) mobile communications system, an assumption that the 5G system may be virtualized as the switching node in the TSN and implement a function of the switching node in the TSN is proposed. Specifically, based on a current network architecture of the 5G system, a control plane of a TSN adaptation function is added to an application function (AF) network element, and a user plane of the TSN adaptation function is added to each of a user plane function (UPF) network element and a user equipment (UE). The AF network element, the UPF network element, the UE, and the 5G system jointly form a logical switching node (logical bridge), that is, a virtual switching node, which serves as the switching node in the TSN.

Although the assumption that the 5G system is virtualized as the switching node in the TSN is proposed, how to specifically implement deterministic end-to-end transmission of a quality of service (QoS) flow in the 5G system is not proposed. Therefore, for the QoS flow in the 5G system, how to implement deterministic end-to-end transmission is an urgent technical problem to be resolved.

SUMMARY

A technical problem to be resolved in embodiments of this application is to provide a time-sensitive networking communication method and an apparatus, to implement deterministic end-to-end transmission of a QoS flow in a 5G system.

A first aspect of the embodiments of this application provides a time-sensitive networking communication method, including: receiving, by a policy control network element, forwarding policy information of TSN traffic, where the forwarding policy information of the TSN traffic is used to trigger the policy control network element to manage a QoS flow corresponding to the TSN traffic; determining, by the policy control network element, a user terminal corresponding to the TSN traffic, and determining, in a QoS flow corresponding to the user terminal, the QoS flow corresponding to the TSN traffic; creating or updating, by the policy control network element according to the forwarding policy information of the TSN traffic, a QoS policy of the QoS flow corresponding to the TSN traffic; and sending, by the policy control network element, the created or updated QoS policy of the QoS flow corresponding to the TSN traffic to a session management network element.

The forwarding policy information of the TSN traffic is forwarding policy information of the TSN traffic on a virtual switching node, and the virtual switching node is a virtual switching node corresponding to an identifier of a port that transmits the TSN traffic. The forwarding policy information of the TSN traffic includes traffic information of the TSN traffic and the identifier of the port that transmits the TSN traffic. The traffic information of the TSN traffic may be used by the policy control network element to obtain, through screening, the QoS flow corresponding to the TSN traffic. Identifiers of ports that transmit the TSN traffic are used to identify a port that receives the TSN traffic and a port that sends the TSN traffic.

According to the first aspect of the embodiments of this application, when receiving the forwarding policy information of the TSN traffic, the policy control network element first determines the user terminal corresponding to the TSN traffic, then determines the QoS flow corresponding to the TSN traffic, creates or updates the QoS policy of the QoS flow corresponding to the TSN traffic, and sends the QoS policy of the QoS flow corresponding to the TSN traffic to the session management network element. As such, the session management network element delivers a QoS policy to each of a user plane function network element and the user terminal. Therefore, the QoS flow corresponding to the TSN traffic is received and sent on specified ports, in order to implement deterministic end-to-end transmission of the QoS flow in a 5G system.

In a possible implementation, the policy control network element receives the forwarding policy information of the TSN traffic from an application function network element. The application function network element directly triggers the policy control network element to manage the QoS flow corresponding to the TSN traffic. This is easy to implement.

In a possible implementation, the policy control network element receives the forwarding policy information of the TSN traffic from the session management network element. The session management network element triggers the policy control network element to manage the QoS flow corresponding to the TSN traffic. The session management network element can learn of the forwarding policy information of the TSN traffic, such that the session management network element determines the user terminal corresponding to the TSN traffic.

The forwarding policy information that is of the TSN traffic and that is sent by the session management network element to the policy control network element may be directly from an application function network element, or may be from a user plane function network element. When receiving the forwarding policy information of the TSN traffic from the application function network element, the user plane function network element sends the forwarding policy information to the session management network element. When receiving the forwarding policy information of the TSN traffic from the application function network element, the user plane function network element can also determine the user terminal corresponding to the TSN traffic.

In a possible implementation, the forwarding policy information of the TSN traffic further includes a time slice for transmitting the TSN traffic, and the time slice is used to specify a specific time period in which the TSN traffic is received and a specific time period in which the TSN traffic is sent. Additionally, the time slice may also be used to obtain, through screening, the QoS flow corresponding to the TSN traffic.

In a possible implementation, the forwarding policy information of the TSN traffic further includes information about a maximum delay of transmitting the TSN traffic, and the information is used to indicate the maximum delay of transmitting the TSN traffic on the virtual switching node. Additionally, the information may also be used to obtain, through screening, the QoS flow corresponding to the TSN traffic.

In a possible implementation, the forwarding policy information of the TSN traffic further includes a virtual switching node identifier, and the virtual switching node identifier is an identifier of the virtual switching node corresponding to the identifier of the port that transmits the TSN traffic. The virtual switching node identifier is used to indicate a specific virtual switching node on which the forwarding policy information of the TSN traffic acts.

In a possible implementation, the policy control network element receives a user terminal identifier from the application function network element, and determines, as the user terminal corresponding to the TSN traffic, a user terminal identified by the user terminal identifier. The user terminal identifier is used to identify the user terminal corresponding to the TSN traffic, and is determined by the application function network element. After determining the user terminal corresponding to the TSN traffic, the application function network element notifies the policy control network element of an identifier of the user terminal, such that the policy control network element can quickly and conveniently learn of the user terminal corresponding to the TSN traffic.

In a possible implementation, the user terminal identifier sent by the application function network element to the policy control network element may be further used to identify a protocol data unit (PDU) session corresponding to the TSN traffic, such that the policy control network element learns of the PDU session corresponding to the TSN traffic, and determines the user terminal corresponding to the TSN traffic.

In a possible implementation, the policy control network element determines a packet data unit (PDU) session corresponding to the TSN traffic to determine the user terminal corresponding to the TSN traffic, and then determines, in a QoS flow corresponding to the PDU session, the QoS flow corresponding to the TSN traffic, such that the policy control network element manages the QoS flow corresponding to the TSN traffic. The PDU session is a session between the user terminal and the user plane function network element. The user terminal corresponding to the PDU session may be determined by determining the PDU session.

In a possible implementation, the policy control network element maintains or stores a correspondence between each virtual port identifier and a PDU session. When receiving the forwarding policy information of the TSN traffic, the policy control network element determines, based on the correspondence and the identifier of the port that transmits the TSN traffic, a PDU session corresponding to an identifier of a virtual port that transmits the TSN traffic, and determines the PDU session as the PDU session corresponding to the TSN traffic.

In a possible implementation, the policy control network element maintains or stores a correspondence among each virtual port identifier, a virtual switching node, and a PDU session. When the forwarding policy information of the TSN traffic includes a virtual switching node identifier, the policy control network element determines, based on the correspondence, the identifier of the port that transmits the TSN traffic, and the virtual switching node identifier, a PDU session corresponding to the virtual switching node identifier and an identifier of a virtual port that transmits the TSN traffic, and determines the PDU session as the PDU session corresponding to the TSN traffic. In this implementation, a virtual port identifier is unique on a virtual switching node.

In a possible implementation, the policy control network element maintains or stores a correspondence among each virtual port identifier, a TSN identifier, and a PDU session. Additionally, the policy control network element determines, based on a TSN identifier and the identifier of the port that transmits the TSN traffic, a PDU session corresponding to the TSN identifier and the identifier of the port that transmits the TSN traffic, and determines the PDU session as the PDU session corresponding to the TSN traffic. The TSN identifier is a TSN identifier corresponding to the TSN traffic. In this implementation, a virtual port identifier is unique in a TSN domain identified by a TSN identifier.

In a possible implementation, the policy control network element maintains or stores a correspondence among each virtual port identifier, data network name (DNN) information, and a PDU session. Additionally, the policy control network element determines, based on DNN information and the identifier of the port that transmits the TSN traffic, a PDU session corresponding to the DNN information and the identifier of the port that transmits the TSN traffic, and determines the PDU session as the PDU session corresponding to the TSN traffic. In this implementation, a virtual port identifier is unique in a data network identified by DNN information.

In a possible implementation, the policy control network element may receive a PDU session identifier from the session management network element or the application function network element, and the PDU session identifier is used to indicate a PDU session corresponding to the TSN traffic. The policy control network element may determine, based on the PDU session identifier, the PDU session corresponding to the TSN traffic, and then determine the user terminal corresponding to the TSN traffic, such that processing load of the policy control network element can be alleviated.

In a possible implementation, the traffic information of the TSN traffic includes a traffic class of the TSN traffic, and the policy control network element determines, based on the traffic class of the TSN traffic in the QoS flow corresponding to the determined user terminal, a QoS flow corresponding to the traffic class of the TSN traffic, and determines the QoS flow as the QoS flow corresponding to the TSN traffic. Alternatively, the policy control network element determines, in the QoS flow corresponding to the determined PDU session, a QoS flow corresponding to the traffic class of the TSN traffic, and determines the QoS flow as the QoS flow corresponding to the TSN traffic.

In a possible implementation, the policy control network element receives a traffic class of the TSN traffic from the application function network element, determines, based on the traffic class of the TSN traffic in the QoS flow corresponding to the determined user terminal, a QoS flow corresponding to the traffic class of the TSN traffic, and determines the QoS flow as the QoS flow corresponding to the TSN traffic.

A correspondence between a traffic class and a 5G QoS identifier (5QI) is configured or stored in the policy control network element. The 5QI is used to identify a 5G QoS flow. A 5QI corresponding to the traffic class may be searched for based on the traffic class of the TSN traffic, to determine the QoS flow corresponding to the TSN traffic. Alternatively, a correspondence between a QoS flow and a traffic class is configured or stored in the policy control network element. The QoS flow corresponding to the traffic class may be searched for based on the traffic class of the TSN traffic, and the QoS flow corresponding to the traffic class is determined as the QoS flow corresponding to the TSN traffic.

In a possible implementation, the policy control network element receives, from the application function network element, a 5QI corresponding to the TSN traffic, and determines, as the QoS flow corresponding to the TSN traffic, a QoS flow identified by the 5QI.

In a possible implementation, when the policy control network element receives the forwarding policy information of the TSN traffic from the application function network element, the forwarding policy information of the TSN traffic includes the traffic information of the TSN traffic and the identifier of the port that transmits the TSN traffic, and the policy control network element sends a request message to the session management network element. The request message includes the identifier of the port that transmits the TSN traffic, and is used to request a transmission delay between a port pair corresponding to the identifier of the port that transmits the TSN traffic. The policy control network element receives a response message from the session management network element, and the response message includes the transmission delay between the port pair. The policy control network element sends the transmission delay between the port pair to the application function network element. The transmission delay between the port pair may be used as delay information of a port pair of a virtual switching node, such that the application function network element feeds back the delay information to a TSN. Therefore, the TSN learns of the delay information of the port pair of the virtual switching node, and generates a time slice or information about a maximum delay of the TSN traffic on the virtual switching node.

In a possible implementation, the traffic information of the TSN traffic includes a destination MAC address of the TSN traffic. Additionally, the policy control network element selects, based on the destination MAC address of the TSN traffic from the QoS flow corresponding to the determined user terminal or from the QoS flow corresponding to the determined PDU session, a QoS flow having a same destination MAC address as the TSN traffic, and determines the QoS flow as the QoS flow corresponding to the TSN traffic.

In a possible implementation, when the forwarding policy information of the TSN traffic includes a time slice for transmitting the TSN traffic or information about a maximum delay of transmitting the TSN traffic, based on the time slice for transmitting the TSN traffic or the information about the maximum delay of transmitting the TSN traffic, the policy control network element selects, from the QoS flow corresponding to the determined user terminal or from the QoS flow corresponding to the determined PDU session, a QoS flow matching the time slice for transmitting the TSN traffic or the information about the maximum delay of transmitting the TSN traffic, and determines the QoS flow as the QoS flow corresponding to the TSN traffic. The policy control network element selects, from the existing QoS flow corresponding to the determined user terminal or from the existing QoS flow corresponding to the determined PDU session, the QoS flow corresponding to the TSN traffic, in order to update the QoS policy of the QoS flow corresponding to the TSN traffic.

In a possible implementation, if the QoS flow corresponding to the TSN traffic does not exist in the existing QoS flow corresponding to the determined user terminal or in the existing QoS flow corresponding to the determined PDU session, the policy control network element may create, according to the forwarding policy information of the TSN traffic on the determined user terminal or in the determined PDU session, the QoS flow corresponding to the TSN traffic.

In a possible implementation, the QoS policy of the QoS flow corresponding to the TSN traffic includes a QoS policy of the QoS flow corresponding to the TSN traffic on a user plane function network element. Additionally, the policy control network element determines a port identifier on the user plane function network element based on the identifier of the port that transmits the TSN traffic, and creates or updates, based on the port identifier on the user plane function network element and the traffic information of the TSN traffic, the QoS policy of the QoS flow corresponding to the TSN traffic on the user plane function network element, such that the user plane function network element controls, according to the QoS policy, the QoS flow corresponding to the TSN traffic.

When the forwarding policy information of the TSN traffic includes a time slice for transmitting the TSN traffic, the policy control network element determines the port identifier on the user plane function network element based on the identifier of the port that transmits the TSN traffic, determines, based on the time slice for transmitting the TSN traffic, a time slice corresponding to the port identifier on the user plane function network element, and creates or updates, based on the port identifier on the user plane function network element, the time slice corresponding to the port identifier on the user plane function network element, and the traffic information of the TSN traffic, the QoS policy of the QoS flow corresponding to the TSN traffic on the user plane function network element. As such, the user plane function network element controls, according to the QoS policy, the QoS flow corresponding to the TSN traffic.

A second aspect of the embodiments of this application provides a policy control network element, and the policy control network element has a function of implementing the method provided in the first aspect. The function may be implemented by hardware, or may be implemented by hardware by executing corresponding software. The hardware or software includes one or more modules corresponding to the foregoing function.

In a possible implementation, the policy control network element includes a processing unit and a transceiver unit. The transceiver unit is configured to receive forwarding policy information of TSN traffic, where the forwarding policy information of the TSN traffic is used to trigger the policy control network element to manage a QoS flow corresponding to the TSN traffic. The processing unit is configured to: determine a user terminal corresponding to the TSN traffic; determine, in a QoS flow corresponding to the user terminal, the QoS flow corresponding to the TSN traffic; and create or update, according to the forwarding policy information of the TSN traffic, a QoS policy of the QoS flow corresponding to the TSN traffic. The transceiver unit is further configured to send the created or updated QoS policy of the QoS flow corresponding to the TSN traffic to a session management network element.

In a possible implementation, the policy control network element includes a processor, a transceiver, and a memory. The memory stores a computer program. The computer program includes a program instruction. The processor is configured to invoke program code to perform the following operations: controlling the transceiver to receive forwarding policy information of TSN traffic, where the forwarding policy information of the TSN traffic is used to trigger the policy control network element to manage a QoS flow corresponding to the TSN traffic; determining a user terminal corresponding to the TSN traffic; determining, in a QoS flow corresponding to the user terminal, the QoS flow corresponding to the TSN traffic; creating or updating, according to the forwarding policy information of the TSN traffic, a QoS policy of the QoS flow corresponding to the TSN traffic; and controlling the transceiver to send the created or updated QoS policy of the QoS flow corresponding to the TSN traffic to a session management network element.

Based on a same concept, for a problem-resolving principle and beneficial effects of the policy control network element, refer to the method and beneficial effects brought by the method in the first aspect. Therefore, for implementation of the apparatus, refer to the implementation of the method. Repeated parts are not described again.

A third aspect of the embodiments of this application provides a computer-readable storage medium. The computer-readable storage medium stores an instruction, and when the instruction is run on a computer, the computer is enabled to perform the method according to the first aspect.

A fourth aspect of the embodiments of this application provides a computer program product including an instruction. When the computer program product is run on a computer, the computer is enabled to perform the method according to the first aspect.

A fifth aspect of the embodiments of this application provides a time-sensitive networking communication method, including: receiving, by an application function network element, forwarding policy information of TSN traffic, where the forwarding policy information of the TSN traffic includes traffic information of the TSN traffic and an identifier of a port that transmits the TSN traffic; determining, by the application function network element based on the identifier of the port that transmits the TSN traffic, a user terminal identifier corresponding to the TSN traffic; and sending, by the application function network element, the user terminal identifier corresponding to the TSN traffic to a policy control network element.

In the fifth aspect of the embodiments of this application, when receiving the forwarding policy information of the TSN traffic, the application function network element determines the user terminal identifier corresponding to the TSN traffic, and sends the determined user terminal identifier corresponding to the TSN traffic to the policy control network element. As such, the policy control network element determines a user terminal corresponding to the TSN traffic, and then determines a QoS flow corresponding to the TSN traffic. This helps the policy control network element manage the QoS flow corresponding to the TSN traffic.

In a possible implementation, the user terminal identifier sent by the application function network element to the policy control network element may be further used to identify a PDU session corresponding to the TSN traffic. As such, the policy control network element learns of the PDU session corresponding to the TSN traffic, and determines the user terminal corresponding to the TSN traffic.

When sending the user terminal identifier corresponding to the TSN traffic to the policy control network element, the application function network element may send the forwarding policy information of the TSN traffic together to the policy control network element. As such, the policy control network element learns of both the forwarding policy information of the TSN traffic and the user terminal identifier corresponding to the TSN traffic. The user terminal identifier corresponding to the TSN traffic and the forwarding policy information of the TSN traffic may alternatively be sent to the policy control network element separately, to alleviate information load of a same message.

In a possible implementation, the application function network element receives a virtual port identifier and a user terminal identifier corresponding to the virtual port identifier from a session management network element, and records a correspondence between the virtual port identifier and the user terminal identifier. In other words, the application function network element stores a correspondence between each virtual port identifier and a user terminal identifier. As such, when receiving the forwarding policy information of the TSN traffic, the application function network element can determine, based on an identifier of a virtual port that transmits the TSN traffic, the user terminal corresponding to the TSN traffic.

When receiving the forwarding policy information of the TSN traffic, the application function network element determines, based on the identifier of the port that transmits the TSN traffic and the correspondence between the virtual port identifier and the user terminal identifier, a user terminal identifier corresponding to the identifier of the virtual port that transmits the TSN traffic, and determines the user terminal identifier as the user terminal identifier corresponding to the TSN traffic, in order to notify the policy control network element of the user terminal identifier.

In a possible implementation, the traffic information of the TSN traffic includes a traffic class of the TSN traffic. The application function network element may alternatively determine, based on the traffic class of the TSN traffic, a 5QI corresponding to the TSN traffic, and then determine, based on the 5QI corresponding to the TSN traffic, the QoS flow corresponding to the TSN traffic.

When the traffic information of the TSN traffic includes no traffic class of the TSN traffic, the application function network element may determine a traffic class of the TSN traffic, and send the traffic class of the TSN traffic to the policy control network element. As such, the policy control network element determines, based on the traffic class of the TSN traffic, the 5QI corresponding to the TSN traffic. The application function network element may determine the traffic class of the TSN traffic based on a class of service of the TSN traffic.

After determining the 5QI corresponding to the TSN traffic, the application function network element may send the 5QI corresponding to the TSN traffic to the session management network element. If no QoS flow corresponding to the TSN traffic exists in an existing QoS flow corresponding to the determined user terminal or in an existing QoS flow corresponding to the determined PDU session, the session management network element may create, based on the 5QI corresponding to the TSN traffic, the QoS flow corresponding to the TSN traffic.

After determining the 5QI corresponding to the TSN traffic, the application function network element sends the 5QI corresponding to the TSN traffic to the policy control network element, such that the policy control network element learns of the QoS flow corresponding to the TSN traffic.

That the application function network element determines, based on the traffic class of the TSN traffic, the 5QI corresponding to the TSN traffic is as follows: a correspondence between a traffic class and a 5QI is configured or stored in the application function network element; and when receiving the traffic information of the TSN traffic, the application function network element searches, based on the traffic class of the TSN traffic, for a 5QI corresponding to the traffic class, and determines the 5QI as the 5QI corresponding to the TSN traffic.

In a possible implementation, when determining the user terminal corresponding to the TSN traffic, the application function network element may alternatively determine, through the policy control network element, the PDU session corresponding to the TSN traffic, and determine, based on the PDU session, the user terminal corresponding to the TSN traffic.

A sixth aspect of the embodiments of this application provides an application function network element, and the application function network element has a function of implementing the method provided in the fifth aspect. The function may be implemented by hardware, or may be implemented by hardware by executing corresponding software. The hardware or software includes one or more modules corresponding to the foregoing function.

In a possible implementation, the application function network element includes a processing unit and a transceiver unit. The transceiver unit is configured to receive forwarding policy information of TSN traffic, where the forwarding policy information of the TSN traffic includes traffic information of the TSN traffic and an identifier of a port that transmits the TSN traffic. The processing unit is configured to determine, based on the identifier of the port that transmits the TSN traffic, a user terminal identifier corresponding to the TSN traffic. The transceiver unit is further configured to send the user terminal identifier corresponding to the TSN traffic to a policy control network element.

In a possible implementation, the application function network element includes a processor, a transceiver, and a memory. The memory stores a computer program. The computer program includes a program instruction. The processor is configured to invoke program code to perform the following operations: controlling the transceiver to receive forwarding policy information of TSN traffic, where the forwarding policy information of the TSN traffic includes traffic information of the TSN traffic and an identifier of a port that transmits the TSN traffic; determining, based on the identifier of the port that transmits the TSN traffic, a user terminal identifier corresponding to the TSN traffic; and controlling the transceiver to send the user terminal identifier corresponding to the TSN traffic to a policy control network element.

Based on a same concept, for a problem-resolving principle and beneficial effects of the application function network element, refer to the method and beneficial effects brought by the method in the fifth aspect. Therefore, for implementation of the apparatus, refer to the implementation of the method. Repeated parts are not described again.

A seventh aspect of the embodiments of this application provides a computer-readable storage medium. The computer-readable storage medium stores an instruction, and when the instruction is run on a computer, the computer is enabled to perform the method according to the fifth aspect.

An eighth aspect of the embodiments of this application provides a computer program product including an instruction. When the computer program product is run on a computer, the computer is enabled to perform the method according to the fifth aspect.

BRIEF DESCRIPTION OF DRAWINGS

To describe the technical solutions in the embodiments of this application or in the background more clearly, the following briefly describes the accompanying drawings required for describing the embodiments of this application or the background.

DESCRIPTION OF EMBODIMENTS

Figure 1:
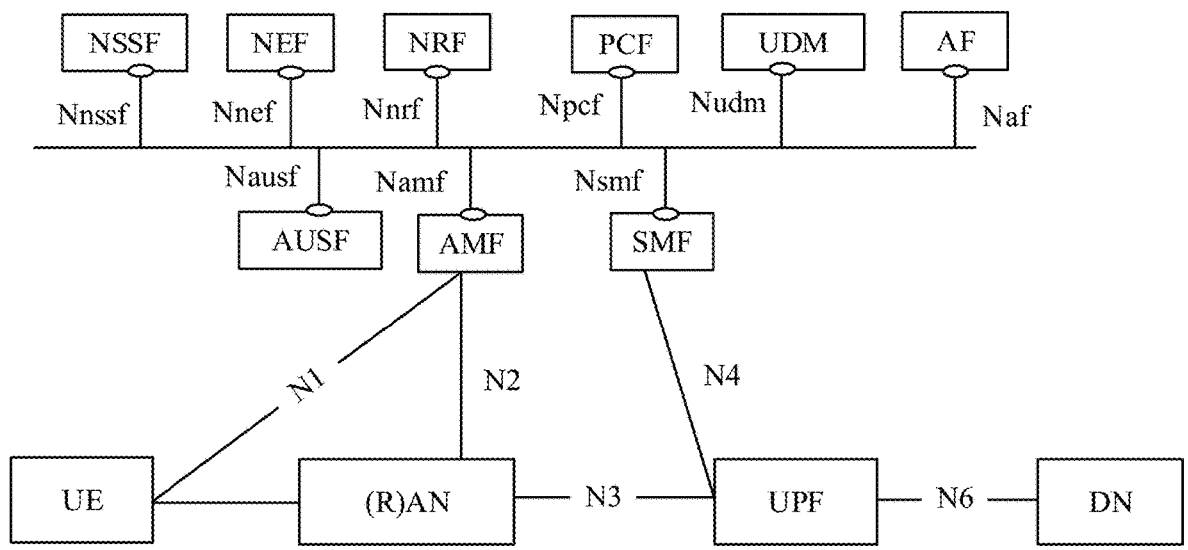
FIG. 1 is a schematic diagram of a network architecture of a 5G system.

The following describes the technical solutions in the embodiments of this application with reference to the accompanying drawings in the embodiments of this application. In descriptions of this application, unless otherwise specified, "I" indicates an "or" relationship between associated objects. For example, AB may represent A or B. In this application, "and/or" merely describes an association relationship between associated objects and represents that three relationships may exist. For example, A and/or B may represent the following three cases: only A exists, both A and B exist, and only B exists, where A and B may be in a singular form or plural form. In addition, in the descriptions of this application, unless otherwise specified, "a plurality of" means two or more than two. "At least one of the following items (pieces)" or a similar expression thereof means any combination of the items, and includes any combination of one item (piece) or a plurality of items (pieces). For example, at least one (piece) of a, b, or c may represent a, b, c, a combination of a and b, a combination of a and c, a combination of b and c, or a combination of a, b, and c, where a, b, and c may be in a singular or plural form. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" are not intended to limit a quantity or an execution sequence, and the terms such as "first" and "second" do not indicate a definite difference.

In addition, a system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with the evolution of the network architecture and the emergence of new service scenarios, the technical solutions provided in the embodiments of this application are also applicable to similar technical problems.

A user terminal in the embodiments of this application may include various handheld devices, vehicle-mounted devices, wearable devices, or computing devices that have a wireless communication function, or other processing devices connected to a wireless modem; or may include a UE, a subscriber unit, a cellular phone, a smartphone, a wireless data card, a personal digital assistant (PDA) computer, a tablet computer, a wireless modem (modem), a handheld device, a laptop computer, a cordless phone, a wireless local loop (WLL) station, a machine type communication (MTC) terminal, a mobile station (MS), a terminal device, relay user equipment, or the like. The relay user equipment may be, for example, a 5G residential gateway (RG). For ease of description, in the embodiments of this application, the devices mentioned above are collectively referred to as user terminals, and an example in which the user terminal is a UE is used for description.

FIG. 1 is a schematic diagram of a network architecture of a 5G system. The network architecture includes a UE, an access network (RN) device, and a core network element.

The access network device may alternatively be a radio access network (RAN) device.

The core network element may include these network elements: a UPF, a data network (DN), an authentication server function (AUSF), an access and mobility management function (AMF), a session management function (SMF), a network slice selection function (NSSF), a network exposure function (NEF), a network repository function (NRF), a policy control function (PCF), unified data management (UDM), and an AF.

The core network element may be divided into a control plane network element and a user plane network element. The user plane network element is a UPF network element, and is mainly responsible for forwarding a data packet, controlling quality of service (QoS), collecting statistics about charging information, and the like. The control plane network element is mainly responsible for service procedure interaction, and delivering a data packet forwarding policy, a QoS control policy, and the like to a user plane. The control plane network element in this embodiment of this application mainly includes these network elements: an AMF, an SMF, a PCF, an AF, and an NEF.

The AMF network element is mainly responsible for user access and mobility management. The SMF network element is responsible for managing creation, deletion, and the like of a PDU session of a user, and maintaining a PDU session context and user plane forwarding pipeline information. The PCF network element is configured to generate and manage a user session and a QoS flow processing policy. The AF network element is a function network element configured to provide various business services, can interact with a core network through the NEF network element, and can interact with a policy management framework to perform policy management. The NEF network element is configured to: provide a framework, authentication, and an interface related to network capability exposure; and transmit information between a network function of the 5G system and another network function.

Communications interfaces between the network elements are further marked in the network architecture shown in FIG. 1. The communications interfaces in this embodiment of this application include: N1, which is a communications interface between the UE and the core network control plane AMF network element and is configured to transmit non-access stratum (NAS) signaling; N2, which is a communications interface between the access network device and the AMF network element; N3, which is a communications interface between the access network device and the core network user plane UPF network element and is configured to transmit user data; and N4, which is a communications interface between the core network control plane SMF network element and the UPF network element and is configured to perform policy configuration and the like on the UPF network element.

A session management network element in this embodiment of this application may be the SMF network element, or may be a network element that has a same function as the SMF network element in a future communications system. A user plane function network element may be the UPF network element, or may be a network element that has a same function as the UPF network element in a future communications system. An application function network element may be the AF network element, or may be a network element that has a same function as the AF network element. A policy control network element may be the PCF network element, or may be a network element that has a same function as the PCF network element.

Figure 2:
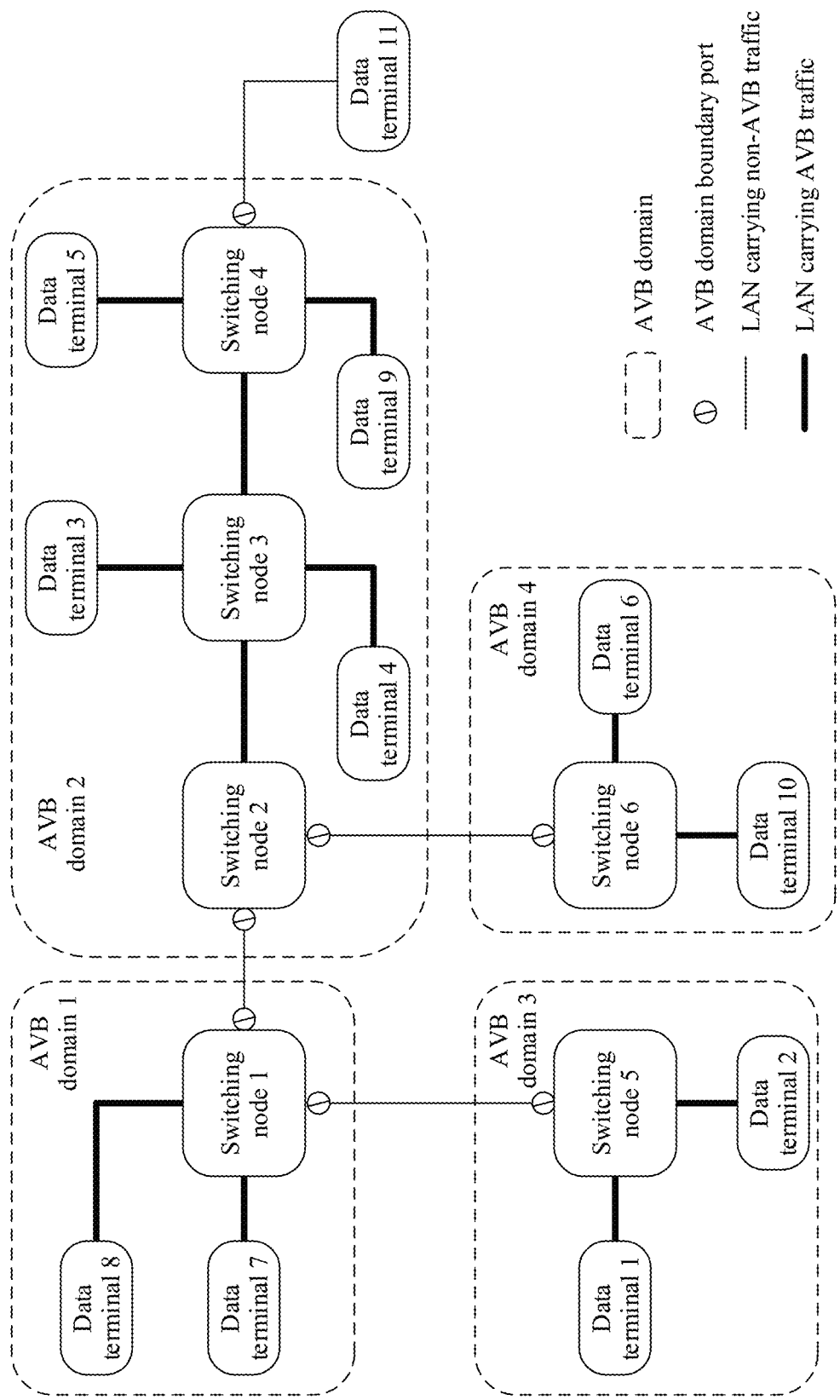
FIG. 2 is a schematic diagram of a network topology of a TSN.

FIG. 2 is a schematic structural diagram of a network topology of a TSN. In the network topology, four audio video bridging (AVB) domains are used as an example. AVB may also be referred to as TSN, and the AVB domain shown in FIG. 2 is also referred to as a TSN domain.

The TSN is based on layer 2 transmission and includes a switching node and a data terminal. A difference from layer 2 switching at a link layer is as follows: The layer 2 switching at the link layer is based on media access control (MAC) address forwarding, and a switching device obtains a forwarding port by querying a MAC address learning table. However, the switching node in the TSN does not forward TSN traffic based on a MAC address learning table, but forwards the TSN traffic according to a forwarding rule configured or created in the switching node. The TSN standard defines behavior of the data terminal and the switching node and a scheduling manner in which the switching node forwards the TSN traffic, in order to implement reliable delay transmission. The switching node in the TSN uses a destination MAC address or another feature of the TSN traffic as an identifier of the TSN traffic, and performs resource reservation and scheduling planning based on a delay requirement of the TSN traffic, to ensure reliability and a guaranteed transmission delay according to a generated scheduling policy.

Data terminals are a sender and a receiver of TSN traffic. For example, the sender of the TSN traffic may be referred to as a transmit end (talker), and the receiver of the TSN traffic may be referred to as a receive end (listener). An AVB domain boundary port is a port that is in an AVB domain and that is connected to a switching node or a data terminal in another AVB domain. For example, there are two AVB domain boundary ports in an AVB domain 1, one port is connected to a switching node 2 in an AVB domain 2, and the other port is connected to a switching node 5 in an AVB domain 3. The TSN traffic does not flow into the AVB domain boundary port. It may be understood that the TSN traffic flows through only the switching node and the data terminal in the AVB domain. Therefore, a local area network (LAN) carries non-AVB traffic between AVB domain boundary ports, and a LAN carries AVB traffic in one AVB domain.

Figure 3:
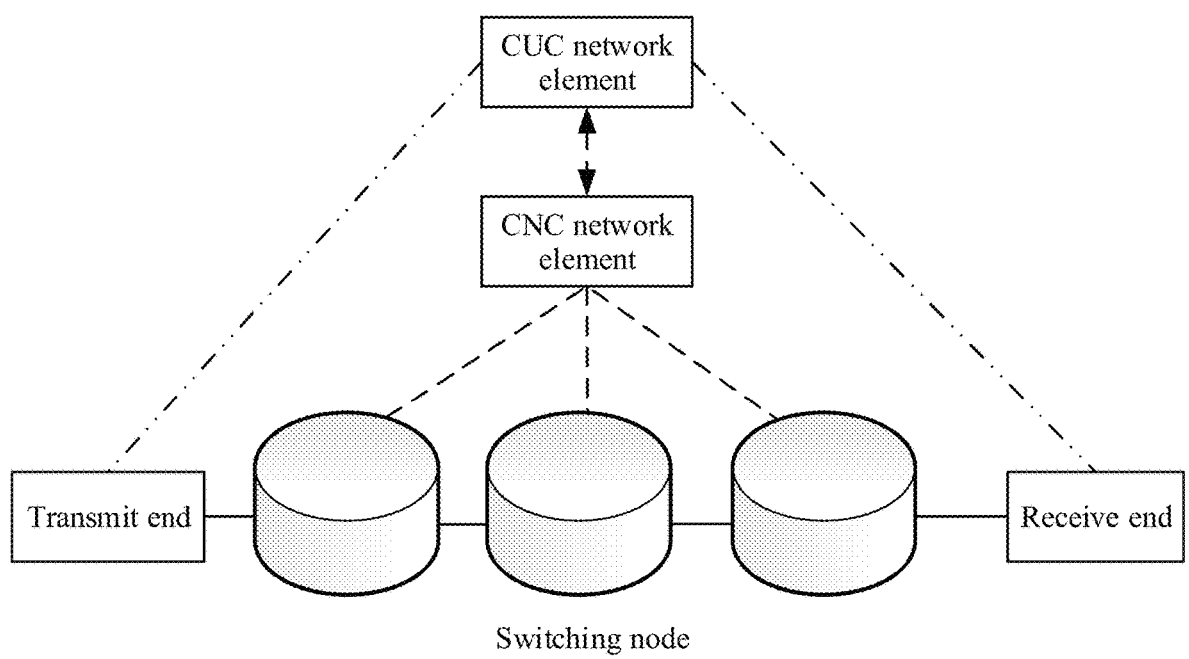
FIG. 3 is a schematic diagram of a centralized management architecture in a TSN.

FIG. 3 is a schematic diagram of a centralized management architecture in a TSN. The centralized management architecture is one of three architectures defined in 802.1qcc in the TSN standard. The centralized management architecture includes a transmit end, a receive end, a switching node, a centralized network configuration (CNC) network element, and a centralized user configuration (CUC) network element. It should be noted that a quantity of network elements and a form of the network element shown in FIG. 3 do not constitute a limitation on this embodiment of this application. In FIG. 3, one transmit end, one receive end, and three switching nodes are used as an example. In actual application, there may be a plurality of transmit ends, a plurality of receive ends, one switching node, or the like.

The switching node reserves a resource for TSN traffic according to a definition in the TSN standard, and schedules and forwards the TSN traffic.

The CNC network element is responsible for managing a topology of a TSN user plane and capability information of the switching node, creating TSN traffic based on a TSN traffic creation request provided by the CUC network element, generating a TSN traffic forwarding path and processing policies on a data terminal and each switching node, and delivering the processing policy on the switching node to the corresponding switching node. The capability information of the switching node may include, for example, a sending delay of the switching node and an internal processing delay between ports of the switching node. The sending delay is a time between a moment of sending TSN traffic on a port of the switching node and a moment at which the TSN traffic arrives at a port of a peer switching node. The internal processing delay is a time between a moment at which TSN traffic arrives at a port of the switching node and a moment at which the TSN traffic is sent on another port of the switching node. The processing policy on the switching node may include, for example, a port and a time slice for receiving and sending TSN traffic. The time slice is time information of receiving and sending the TSN traffic by the switching node. For example, the TSN traffic is received within a time from t1 to t2.

The CUC network element is configured to: collect the TSN traffic creation request of the data terminal; after performing matching on a request of the transmit end and a request of the receive end, request the CNC network element to create the TSN traffic; and confirm the processing policy generated by the CNC network element. The performing matching on a request of the transmit end and a request of the receive end means the following: The transmit end and the receive end each send a TSN traffic creation request to the CUC network element, and the TSN traffic creation request includes some information, for example, a destination MAC address of requested TSN traffic. The CUC network element performs matching on the TSN traffic creation request and a destination MAC address of TSN traffic requested by a different data terminal. If destination MAC addresses of TSN traffic requested by two data terminals are the same, the TSN traffic requested by the two data terminals are the same, the matching succeeds, and the CNC network element can create the TSN traffic. If destination MAC addresses of TSN traffic requested by two data terminals are different, only the TSN traffic creation request of the transmit end or the receive end is available, the CUC network element cannot request the CNC network element to create the TSN traffic, and the CNC network element cannot create the TSN traffic.

It may be understood that the CNC network element and the CUC network element are control plane network elements in the TSN.

802.1qbv in the TSN standard defines a scheduling and forwarding manner: a switching node sends TSN traffic in a configured time slice. With reference to the centralized management architecture in the TSN that is shown in FIG. 3, deterministic end-to-end transmission can be implemented. The CNC network element calculates, based on a sending delay and an internal processing delay of each switching node, a time slice for receiving TSN traffic by each switching node on the TSN traffic forwarding path and a time slice for sending the TSN traffic by each switching node on the TSN traffic forwarding path, generates forwarding policy information of each switching node, and delivers the corresponding forwarding policy information to each switching node. Therefore, each switching node receives and sends specified TSN traffic within determined time slices, in order to ensure that a time and a delay of transmitting the TSN traffic on the entire forwarding path are determined. An example of the time slice for receiving the TSN traffic and the time slice for sending the TSN traffic is as follows: a port 1 of a switching node receives TSN traffic within a time from t1 to t2, and the received TSN traffic is sent on a port 2 within a time from t3 to t4.

The forwarding policy information generated by the CNC network element and delivered to the switching node may include parameters shown in Table 1.

TABLE 1

| Parameter | Description |
| --- | --- |
| Traffic information | Traffic information of TSN traffic, including a destination MAC address of the TSN traffic |
| Receive port identifier | Used to identify a port that receives TSN traffic |
| Time slice of a receive port | Time slice for receiving TSN traffic by the receive port, for example, receiving the TSN traffic within a time from t1 to t2 by the receive port |
| Transmit port identifier | Used to identify a port that sends TSN traffic |
| Time slice of a transmit port | Time slice for sending TSN traffic by the transmit port, for example, sending the TSN traffic within a time from t1 to t2 by the transmit port |

For the scheduling and forwarding manner defined in 802.1qbv, the forwarding policy information delivered by the CNC network element includes the parameters shown in Table 1. For a scheduling and forwarding manner that is not defined in 802.1qbv, the forwarding policy information delivered by the CNC network element does not necessarily include time slice information of a receive port and time slice information of a transmit port.

The destination MAC address of the TSN traffic is allocated by the CNC network element, and is used to identify the TSN traffic. Optionally, the traffic information of the TSN traffic further includes a traffic class or a class of service (CoS) of the TSN traffic, and the traffic class or the class of service is used to further identify the TSN traffic. The traffic class can be determined based on the CoS, and the CoS can be determined based on the traffic class. Optionally, the traffic information of the TSN traffic further includes a virtual local area network (VLAN) identifier of the TSN traffic, and the VLAN identifier is used to further identify the TSN traffic. Optionally, the traffic information of the TSN traffic further includes a VLAN identifier of the TSN traffic and a traffic class of the TSN traffic, or a VLAN identifier of the TSN traffic and a class of service of the TSN traffic, and the VLAN identifier and the traffic class or the VLAN identifier and the class of service are used to further identify the TSN traffic. The VLAN identifier of the TSN traffic is used to identify a VLAN to which the TSN traffic belongs, the CoS of the TSN traffic is used to identify a class of service to which the TSN traffic belongs, and the traffic class of the TSN traffic is used to identify a traffic class corresponding to the TSN traffic.

To implement deterministic end-to-end transmission in a 5th generation (5G) mobile communications system, an assumption that the 5G system may be virtualized as the switching node in the TSN and implement a function of the switching node in the TSN is proposed. For example, referring to a schematic diagram of a network architecture shown in FIG. 4A, a control plane of a TSN adaptation function is added to an AF network element, a user plane (UP) 1 of the TSN adaptation function is added to a UPF network element, and a UP 2 of the TSN adaptation function is added to UE. The AF network element, the UPF network element, the UE, and the 5G system jointly form a logical switching node, that is, a virtual switching node, which serves as the switching node in the TSN. Although the UPF and the UP 1, and the UE and the UP 2 are separately drawn in FIG. 4A, actually, the UP 1 and the UP 2 are logical functions of the user plane of the TSN adaptation function, and the UP 1 may be deployed on the UPF network element, or the UP 1 may be an internal function module of the UPF network element. Likewise, the UP 2 may be deployed on the UE, or the UP 2 may be an internal function module of the UE.

The TSN adaptation function refers to adapting a feature and information of a 5G network into information required in the TSN, and communicating with a network element in the TSN through an interface defined in the TSN.

The AF network element interacts with a CNC network element in the TSN, and provides information about a logical switching node for the CNC network element based on a requirement of a TSN switching node. The user plane of the TSN adaptation function provides necessary information for the control plane of the TSN adaptation function. In other words, the UP 1 may provide necessary information for the AF network element, for example, information about a switching node in the TSN.

Figure 4A:
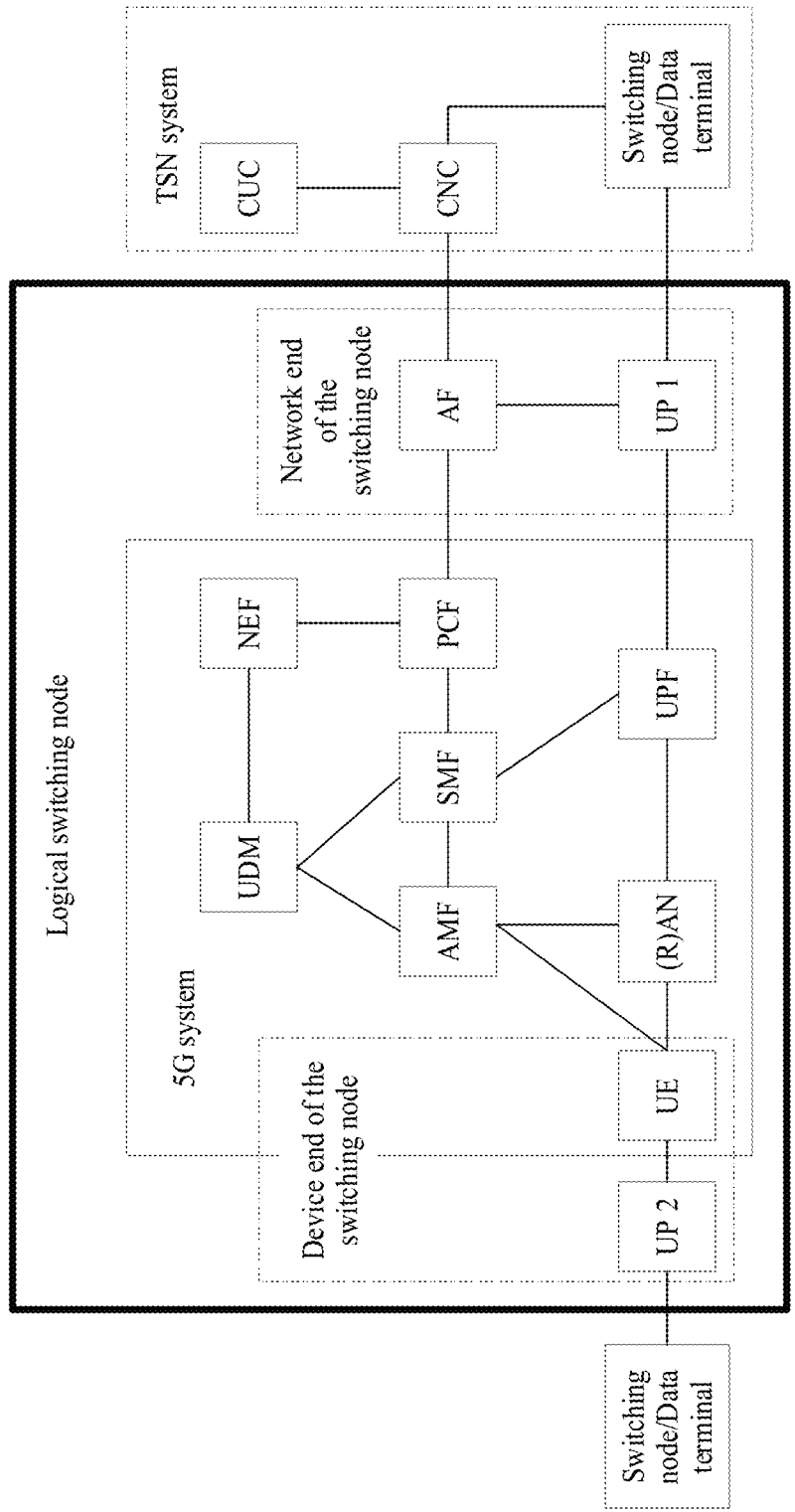
FIG. 4A is a schematic diagram of a network architecture in which a 5G system is virtualized as a switching node in a TSN.

Although the schematic diagram of the network architecture shown in FIG. 4A is proposed, how to specifically implement deterministic transmission of a QoS flow in the 5G system is not proposed. Therefore, for the QoS flow in the 5G system, how to implement deterministic transmission is an urgent technical problem to be resolved.

In view of this, the embodiments of this application provide a time-sensitive networking communication method and an apparatus, to implement deterministic end-to-end transmission of a QoS flow in a 5G system.

Figure 4B:
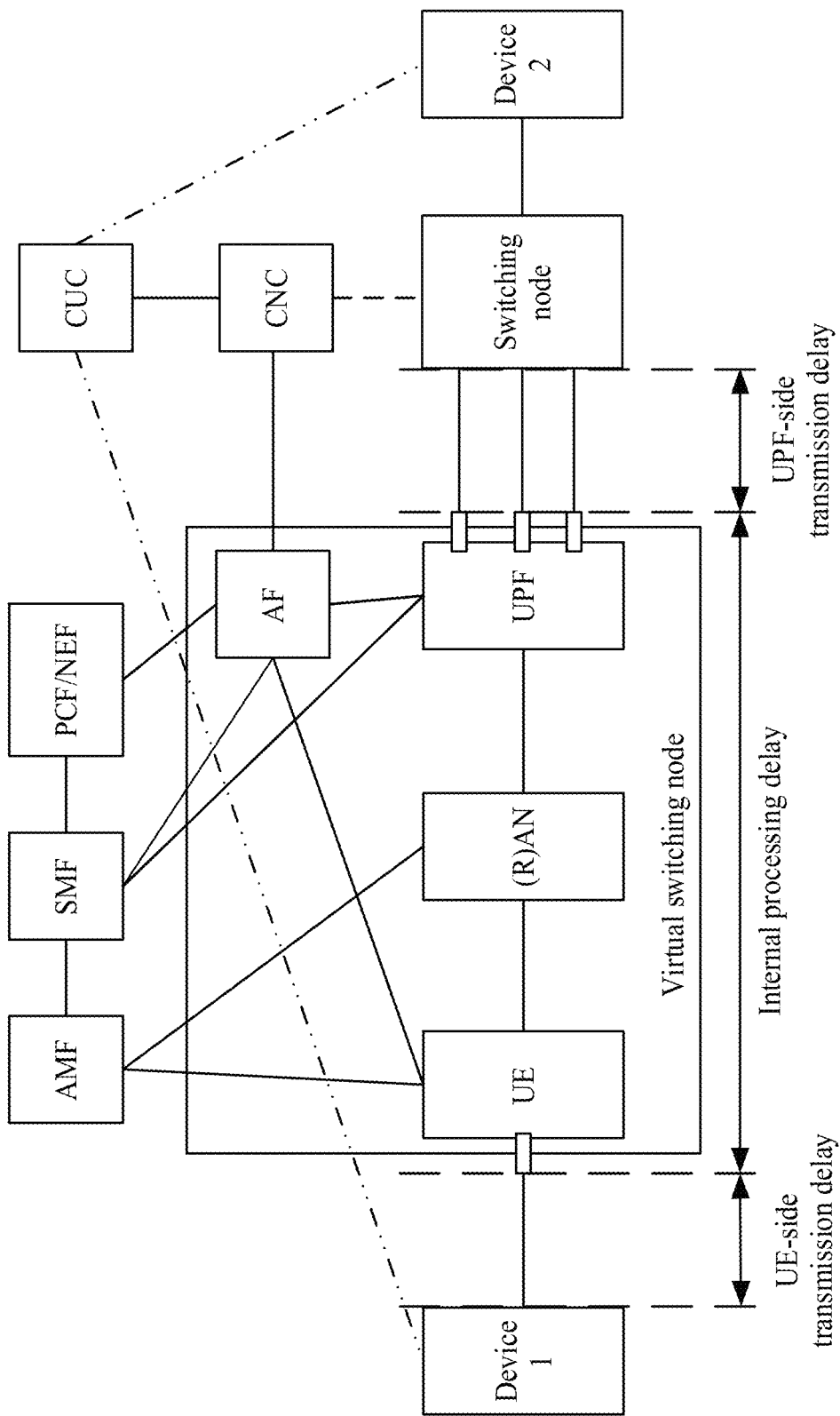
FIG. 4B is a schematic diagram of a network architecture to which an embodiment of this application is applied.

FIG. 4B is a schematic diagram of a network architecture to which an embodiment of this application is applied. In FIG. 4B, a 5G system is virtualized as a switching node in a TSN. Ports of the virtual switching node include a UE-side virtual port and a UPF-side port. The virtual switching node includes a UE, a (R)AN, a UPF network element, and an AF network element.

In this embodiment of this application, the UE-side virtual port included in the virtual switching node may be at a UE granularity. To be more specific, one UE corresponds to one virtual port, and different UEs correspond to different virtual ports. Alternatively, the UE-side virtual port included in the virtual switching node may be at a PDU session granularity. To be more specific, one PDU session corresponds to one virtual port, and different PDU sessions correspond to different virtual ports. Alternatively, the UE-side virtual port included in the virtual switching node may be at a TSN granularity. To be more specific, one TSN domain corresponds to one or more virtual ports. The UE-side virtual port may alternatively be a UE-side physical port, and may include one or more UE-side physical ports. Therefore, one UE may include one or more virtual ports. FIG. 4B shows one virtual port of UE, but this does not constitute a limitation on this embodiment of this application. In actual application, there may be a plurality of UEs. If the UE-side virtual port included in the virtual switching node is at the UE granularity, the virtual switching node may include a plurality of virtual ports on a UE side.

In this embodiment of this application, the UPF-side port included in the virtual switching node is a physical port that actually exists in the UPF network element. One UPF network element may include a plurality of physical ports, and one physical port of the UPF network element corresponds to one virtual switching node. However, one virtual switching node may include a plurality of physical ports of one UPF network element, or may include a plurality of physical ports of a plurality of UPF network elements. The virtual switching node shown in FIG. 4B includes one UPF network element. The UPF network element includes three physical ports. The three physical ports correspond to a same virtual switching node, but this does not constitute a limitation on this embodiment of this application. In actual application, one virtual switching node includes more than one UPF network element. In this case, UPF-side ports included in the virtual switching node include physical ports of more than one UPF network element.

For ease of differentiation, in this embodiment of this application, the UE-side virtual port of the virtual switching node is referred to as a virtual port of the virtual switching node, the UPF-side port of the virtual switching node is referred to as a physical port of the virtual switching node, and a UPF-side port is referred to as a physical port of a UPF for description.

In FIG. 4B, a user plane of a TSN adaptation function is deployed on the UE or a user plane of a TSN adaptation function is an internal function module of the UE, that is, the UP 2 in FIG. 4A. The UP 2 is configured to: obtain attribute information of the UE-side virtual port; and send the attribute information to the AF network element on a user plane or a control plane. The attribute information of the virtual port may include external topology information corresponding to the virtual port and an external transmission delay (that is, a UE-side sending delay) of the virtual port. Likewise, a user plane of the TSN adaptation function is deployed on the UPF or a user plane of the TSN adaptation function is an internal function module of the UPF, that is, the UP 1 in FIG. 4A. The UP 1 is configured to: obtain attribute information of the UPF-side physical port; and send the attribute information to the AF network element on the user plane or the control plane. Additionally, the UP 1 may further exchange user plane-related information and TSN parameter-related information with the AF network element. The attribute information of the physical port may include external topology information corresponding to the physical port and an external transmission delay (that is, a UPF-side sending delay) of the physical port.

In FIG. 4B, the AF network element is a logical network element, and may be a component in another logical network element (for example, a component in an SMF network element), or may be another control plane function network element. A name of the AF network element is not limited herein.

In FIG. 4B, a processing delay between the UE-side virtual port and the UPF-side physical port is referred to as an internal transmission delay. The internal transmission delay is for a port pair, and different port pairs may have different internal transmission delays, for example, an internal transmission delay 1 between a virtual port 1 and a physical port 1, and an internal transmission delay 2 between the virtual port 1 and a physical port 2. Values of the internal transmission delay 1 and the internal transmission delay 2 may be different.

In FIG. 4B, a device 1 and a device 2 may be equivalent to the data terminals in FIG. 2, or may be equivalent to the transmit end or the receive end in FIG. 3. The device 1 is connected to the UE-side virtual port, and the connection may be a physical link, or may be a virtual connection (for example, the device 1 is a processing unit of a device in which the UE is located). The device 1 may be a terminal device other than the UE, or may be a switching node. The device 1 shown in FIG. 4B is used as a terminal device to interact with a CUC network element. If the device 1 is a switching node, the device 1 interacts with a CNC network element (the device 1 is similar to a switching node that is connected to the UPF network element and that is shown in FIG. 4B). The device 2 shown in FIG. 4B is used as a terminal device to interact with the CUC network element. The device 2 is not directly connected to a physical port of the UPF network element. There is a switching node between the device 2 and the virtual switching node. The switching node may be a switching node that actually exists in the TSN, for example, a switching node in a data network (DN) or another virtual switching node. Alternatively, the device 2 may be directly connected to the physical port of the UPF network element.

The following describes the time-sensitive networking communication method provided in the embodiments of this application. In descriptions of the time-sensitive networking communication method, an example in which a user terminal is a UE, a session management network element is an SMF network element, a user plane function network element is a UPF network element, an application function network element is an AF network element, and a policy control network element is a PCF network element is used for description. For ease of description, figures corresponding to the embodiments do not show the two words "network element", and the two words "network element" are not indicated in descriptions of the embodiments. However, this does not affect understanding of the embodiments of this application.

It should be noted that names of messages between network elements in the following embodiments of this application, names of parameters in messages, or the like are merely examples, and there may be other names during other implementations. This is not specifically limited in the embodiments of this application.

Figure 5:
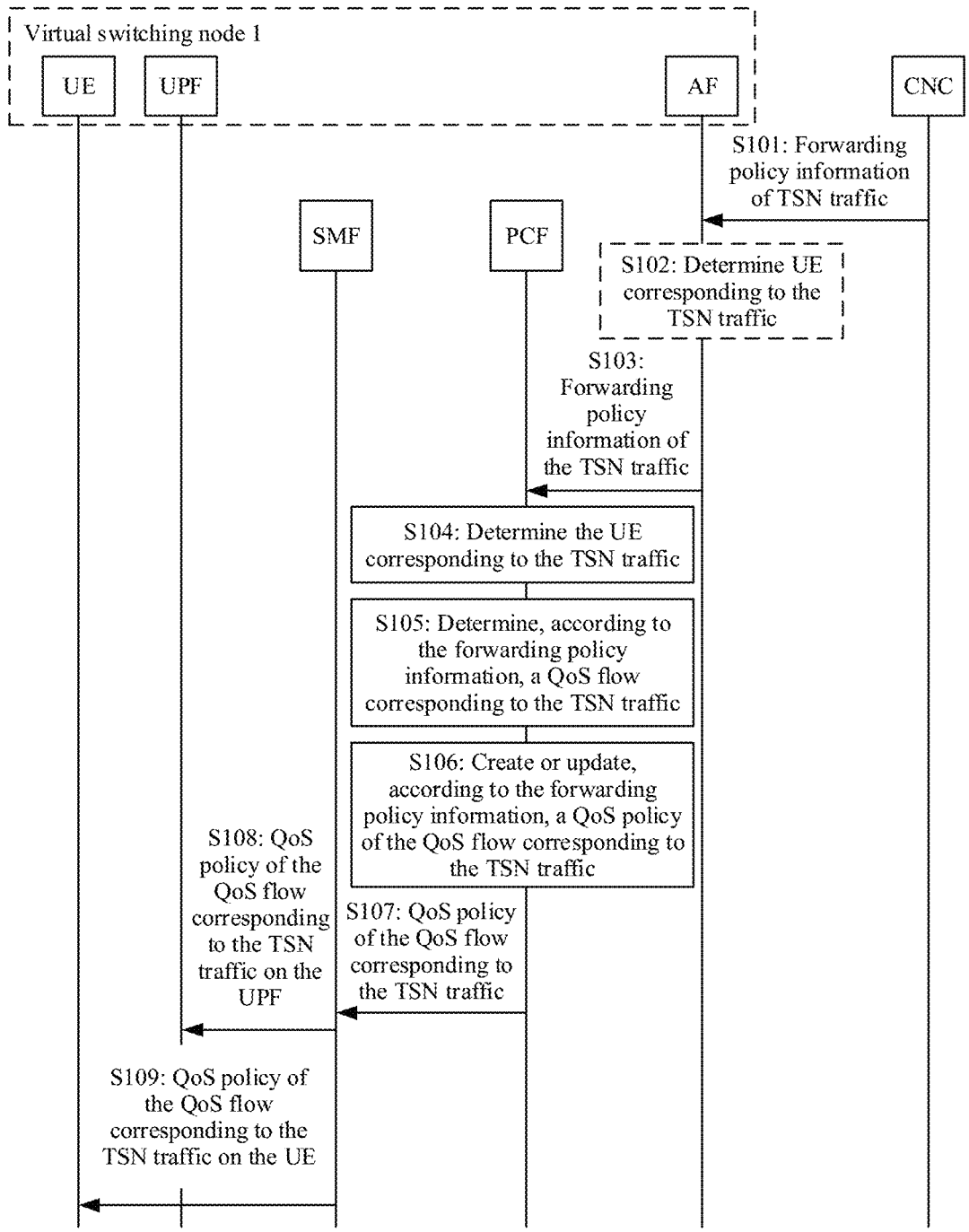
FIG. 5 is a schematic flowchart of a time-sensitive networking communication method according to Embodiment 1 of this application.

An example in which an embodiment of this application is applied to the schematic diagram of the network architecture shown in FIG. 4B is used. FIG. 5 is a schematic flowchart of a time-sensitive networking communication method according to Embodiment 1 of this application. The embodiment shown in FIG. 5 may include but is not limited to the following steps.

Step S101: A CNC sends forwarding policy information of TSN traffic to an AF. Correspondingly, the AF receives the forwarding policy information of the TSN traffic from the CNC.

When receiving a TSN traffic creation request sent by a data terminal, a CUC in a TSN performs matching on TSN traffic creation requests of a transmit end and a receive end. If destination MAC addresses of TSN traffic requested using two TSN traffic creation requests are the same, the CUC requests the CNC to create TSN traffic. The CNC calculates and generates forwarding policy information of the TSN traffic on each switching node based on a network topology, delay information of each switching node, and traffic information of the TSN traffic, and delivers the corresponding forwarding policy information to each switching node. With reference to a network architecture shown in FIG. 4B, it is assumed that a device 1 and a device 2 are data terminals, a virtual switching node as which a 5G system is virtualized is a virtual switching node 1, and a switching node connected to the device 2 is a switching node 2. The foregoing process may be as follows: The device 1 and the device 2 send TSN traffic creation requests to the CUC. After performing matching on the TSN traffic creation requests of the device 1 and the device 2, the CUC requests the CNC to create TSN traffic. The CNC calculates and generates forwarding policy information 1 of the TSN traffic on the virtual switching node 1 and forwarding policy information 2 of the TSN traffic on the switching node 2. The CNC delivers the forwarding policy information 1 to the virtual switching node 1, and delivers the forwarding policy information 2 to the switching node 2.

That the CNC sends the forwarding policy information of the TSN traffic on the virtual switching node 1 to the virtual switching node 1 is as follows: The CNC sends the forwarding policy information of the TSN traffic on the virtual switching node 1 to an AF in the virtual switching node 1. As such, when receiving the forwarding policy information of the TSN traffic on the virtual switching node 1, the AF sends the forwarding policy information of the TSN traffic on the virtual switching node 1 to a PCF in the 5G system. In the schematic flowchart shown in FIG. 5, corresponding to the foregoing assumption, the switching node as which the 5G system is virtualized is used as the virtual switching node 1, and an identifier of the virtual switching node is 1.

The TSN traffic is a data flow in the TSN. Because TSN can ensure deterministic data transmission, the TSN traffic may also be referred to as a deterministic transmission flow. It should be noted that, in this embodiment of this application, the TSN traffic is used to describe a data flow transmitted in the TSN, and other names used to describe the data flow transmitted in the TSN should fall within the protection scope of this embodiment of this application, for example, the deterministic transmission flow.

The forwarding policy information of the TSN traffic is forwarding policy information of the TSN traffic on a switching node. The forwarding policy information varies with a switching node. In this embodiment of this application, the forwarding policy information of the TSN traffic is the forwarding policy information of the TSN traffic on the virtual switching node 1.

The forwarding policy information of the TSN traffic includes traffic information of the TSN traffic and an identifier of a port that transmits the TSN traffic. The traffic information of the TSN traffic may be used by the PCF to obtain, through screening from a plurality of QoS flows corresponding to UE or from a plurality of QoS flows corresponding to a PDU session, a QoS flow corresponding to the TSN traffic. The traffic information of the TSN traffic includes a destination MAC address of the TSN traffic, and optionally further includes a VLAN identifier of the TSN traffic, or optionally further includes a CoS of the TSN traffic or a traffic class of the TSN traffic, or optionally further includes a VLAN identifier of the TSN traffic and a CoS of the TSN traffic, or a VLAN identifier of the TSN traffic and a traffic class of the TSN traffic. Identifiers of ports that transmit the TSN traffic are used to identify a port that receives the TSN traffic and a port that sends the TSN traffic, and include an identifier of the port that receives the TSN traffic and an identifier of the port that sends the TSN traffic.

Optionally, the forwarding policy information of the TSN traffic further includes a time slice for transmitting the TSN traffic. If a scheduling manner (for example, in 802.1qbv) defined in deterministic transmission is used, the time slice for transmitting the TSN traffic is used to specify a specific time period in which the TSN traffic is received and a specific time period in which the TSN traffic is sent. The time slice for transmitting the TSN traffic includes a time slice for receiving the TSN traffic and a time slice for sending the TSN traffic, and includes a time slice for receiving the TSN traffic by the port that receives the TSN traffic and a time slice for sending the TSN traffic by the port that sends the TSN traffic. An example of the time slice for receiving the TSN traffic by the port that receives the TSN traffic is as follows: a port 1 that receives the TSN traffic receives the TSN traffic within a time from t1 to t2. An example of the time slice for sending the TSN traffic by the port that sends the TSN traffic is as follows: a port 2 that sends the TSN traffic sends the TSN traffic within a time from t3 to t4. For content included in the forwarding policy information of the TSN traffic, refer to Table 1.

Optionally, the forwarding policy information of the TSN traffic further includes information about a maximum delay of transmitting the TSN traffic. The information about the maximum delay of transmitting the TSN traffic is used to indicate a maximum transmission delay of the TSN traffic on the switching node.

Optionally, the forwarding policy information of the TSN traffic further includes a virtual switching node identifier, and the virtual switching node identifier is an identifier of a virtual switching node corresponding to the identifier of the port that transmits the TSN traffic, that is, an identifier of a virtual switching node on which the forwarding policy information acts. In this embodiment of this application, the virtual switching node on which the forwarding policy information acts is the virtual switching node 1, and the virtual switching node identifier included in the forwarding policy information is 1. The forwarding policy information includes the virtual switching node identifier, such that the AF learns of the virtual switching node on which the forwarding policy information acts. The AF may determine, based on the virtual switching node identifier and the identifier of the port that transmits the TSN traffic, a PDU session corresponding to the TSN traffic. Subsequently, when receiving the forwarding policy information, the PCF may also determine, based on the virtual switching node identifier and the identifier of the port that transmits the TSN traffic, the PDU session corresponding to the TSN traffic.

Step S102: The AF determines a UE corresponding to the TSN traffic.

In this embodiment of this application, it is assumed that a PDU session created or modified by the UE is carried in the virtual switching node 1. A virtual port identifier corresponding to the PDU session is a virtual port identifier corresponding to the virtual switching node 1.

In a possible implementation, in a scenario in which the UE creates the PDU session, in a process of creating or updating the virtual switching node 1, if an SMF allocates a virtual port identifier to the PDU session, the SMF sends the virtual port identifier of the virtual switching node 1 and a UE identity (ID) corresponding to the virtual port identifier to the AF. The UE ID may be one or more of identifiers such as a MAC address of the UE, an Internet Protocol (IP) address of the UE, an international mobile subscriber identity (IMSI) of the UE, an international mobile equipment identity (IMEI) of the UE, a MAC address of the PDU session, or an IP address of the PDU session.

When receiving the virtual port identifier and the UE ID corresponding to the virtual port identifier, the AF may record a correspondence between the virtual port identifier and the UE ID. Further, the AF stores or maintains a correspondence between each virtual port identifier and a UE ID, such that the AF searches for the corresponding UE ID based on the virtual port identifier.

Optionally, the SMF further sends one or more of a virtual switching node identifier corresponding to the virtual port identifier, a port identifier of a UPF corresponding to the virtual port identifier, a PDU session identifier of the PDU session, DNN information corresponding to the PDU session, or a TSN identifier corresponding to the PDU session to the AF, such that the AF adds one or more of these pieces of information to the correspondence. For example, the SMF further sends the virtual switching node identifier to the AF. In this case, the AF records a correspondence among the virtual port identifier, the virtual switching node identifier, and the UE ID.

In a possible implementation, in a scenario in which the UE creates the PDU session, in a process of creating or updating the virtual switching node 1, if the AF allocates a virtual port identifier to the PDU session, an SMF sends a UE ID corresponding to the PDU session to the AF. When receiving the UE ID, the AF may record a correspondence between the allocated virtual port identifier and the UE ID. Further, the AF stores or maintains a correspondence between each virtual port identifier and a UE ID, such that the AF searches for the corresponding UE ID based on the virtual port identifier.

Optionally, the SMF further sends one or more of a virtual switching node identifier corresponding to the PDU session, a port identifier that is of a UPF and that corresponds to the PDU session, a PDU session identifier of the PDU session, DNN information corresponding to the PDU session, or a TSN identifier corresponding to the PDU session to the AF, such that the AF adds one or more of these pieces of information to the correspondence. For example, the SMF further sends the virtual switching node identifier to the AF.

In this case, the AF records a correspondence among the virtual port identifier, the virtual switching node identifier, and the UE ID.

When receiving the forwarding policy information of the TSN traffic, the AF determines, based on the identifier of the port that transmits the TSN traffic and the correspondence that is between each virtual port identifier and a UE ID and that is maintained by the AF, an identifier of a virtual port that transmits the TSN traffic and a UE ID corresponding to the virtual port identifier, and determines, as the UE corresponding to the TSN traffic, a UE identified by the UE ID. In this embodiment of this application, a UE in the virtual switching node 1 is the UE corresponding to TSN traffic.

In the foregoing process, the AF determines, based on the identifier of the port that transmits the TSN traffic and the maintained correspondence between each virtual port identifier and a UE ID, the UE ID corresponding to the TSN traffic. Because the PDU session is a session between the UE and the UPF, and one PDU session corresponds to one UE, the UE may be determined based on the PDU session. When determining the UE ID corresponding to the TSN traffic, the AF may determine a PDU session corresponding to the TSN traffic, and determine, based on the PDU session, the UE ID corresponding to the TSN traffic.

The PDU session corresponding to the TSN traffic is a PDU session on which the TSN traffic acts. To be more specific, a specific QoS flow transmitted in the PDU session is limited by the TSN traffic. In other words, deterministic transmission or transmission within a maximum delay needs to be implemented for the QoS flow, or the QoS flow needs to be received and sent within determined time slices or needs to be transmitted within a determined maximum delay. It should be noted that a plurality of QoS flows may be transmitted in one PDU session, but not all QoS flows transmitted in one PDU session are limited by the TSN traffic.

That the AF determines the PDU session corresponding to the TSN traffic is an optional step. When receiving the forwarding policy information of the TSN traffic from the CNC, the AF may determine, based on the forwarding policy information, the PDU session corresponding to the TSN traffic.

The AF may determine, in the following several manners, the PDU session corresponding to the TSN traffic.

Manner 1: The AF may directly determine, based on the identifier of the port that transmits the TSN traffic, the PDU session corresponding to the TSN traffic. For example, the AF maintains a correspondence between a virtual port identifier and a PDU session. In this case, the AF may determine, based on the identifier of the port that transmits the TSN traffic and the correspondence between a virtual port identifier and a PDU session, a virtual port identifier in the identifier of the port that transmits the TSN traffic and a PDU session corresponding to the virtual port identifier, and use the PDU session corresponding to the virtual port identifier as the PDU session corresponding to the TSN traffic. In this case, the virtual port identifier is unique on the AF. To be more specific, the correspondence that is between a virtual port identifier and a PDU session and that is maintained on the AF is a one-to-one correspondence, and one PDU session corresponds to one virtual port identifier. Alternatively, the AF maintains a correspondence between a port pair and a PDU session. In this case, the AF determines a port pair based on the identifier of the port that transmits the TSN traffic, further determines a PDU session corresponding to the port pair, and uses the PDU session corresponding to the port pair as the PDU session corresponding to the TSN traffic. In this case, the correspondence that is between a port pair and a PDU session and that is maintained on the AF is a one-to-one or many-to-one correspondence, and one PDU session corresponds to one or more port pairs.

Manner 2: When the forwarding policy information of the TSN traffic includes a virtual switching node identifier, the AF determines, based on the virtual switching node identifier and the identifier of the port that transmits the TSN traffic, the PDU session corresponding to the TSN traffic. In this case, a virtual port identifier is unique on a virtual switching node. In other words, different virtual ports on a same virtual switching node have different virtual port identifiers. The AF maintains a correspondence among a virtual switching node identifier, a virtual port identifier, and a PDU session. In this case, the AF determines, based on the virtual switching node identifier and the identifier of the port that transmits the TSN traffic, a PDU session corresponding to the virtual port identifier and the virtual switching node identifier, and uses the PDU session as the PDU session corresponding to the TSN traffic.

Manner 3: The AF determines, based on the identifier of the port that transmits the TSN traffic and a TSN identifier corresponding to the TSN traffic, the PDU session corresponding to the TSN traffic. In this case, a virtual port identifier is unique in a TSN. In other words, different virtual ports in a same TSN have different virtual port identifiers. The AF maintains a correspondence among a TSN identifier, a virtual port identifier, and a PDU session. In this case, the AF determines, based on the identifier of the port that transmits the TSN traffic and the TSN identifier corresponding to the TSN traffic, a PDU session corresponding to the virtual port identifier and the TSN identifier, and uses the PDU session as the PDU session corresponding to the TSN traffic. The TSN identifier is used to identify a TSN domain.

Optionally, when the traffic information of the TSN traffic includes the VLAN identifier and/or the CoS of the TSN traffic, the AF may determine, based on the VLAN identifier and/or the CoS, the TSN identifier corresponding to the TSN traffic.

Optionally, in a scenario in which the UE creates the PDU session, in a process of creating or updating the virtual switching node, when an SMF requests the AF to allocate a virtual port identifier to the virtual switching node, a message sent by the SMF to the AF carries a TSN identifier corresponding to the PDU session. Then, the AF allocates a unique virtual port identifier to the virtual switching node in the TSN domain identified by the TSN identifier. Subsequently, the AF may establish and record a correspondence among the virtual port identifier, the PDU session, and the TSN identifier, such that the AF determines, based on an identifier of a virtual port that transmits the TSN traffic and the TSN identifier corresponding to the TSN traffic, the PDU session corresponding to the TSN traffic.

Manner 4: The AF determines, based on data network name (DNN) information and the identifier of the port that transmits the TSN traffic, the PDU session corresponding to the TSN traffic. In this case, a virtual port identifier is unique in a data network (DN). The AF maintains a correspondence among DNN information, a virtual port identifier, and a PDU session. In this case, the AF determines, based on the DNN information and the identifier of the port that transmits the TSN traffic, a PDU session corresponding to the virtual port identifier and the DNN information, and uses the PDU session as the PDU session corresponding to the TSN traffic. The DNN information is used to indicate that a data network corresponding to a data network name is a deterministic transmission network.

Optionally, in a scenario in which the UE creates the PDU session, in a process of creating or updating the virtual switching node, when an SMF requests the AF to allocate a virtual port identifier to the virtual switching node, a message sent by the SMF to the AF carries the DNN information corresponding to the PDU session. Then, the AF allocates a unique virtual port identifier to the virtual switching node in a data network identified by the DNN information. Subsequently, the AF may establish and record a correspondence among the virtual port identifier, the PDU session, and the DNN information, such that the AF determines, based on the DNN information and an identifier of a virtual port that transmits the TSN traffic, the PDU session corresponding to the TSN traffic.

Manner 5: The AF determines, based on the identifier of the port that transmits the TSN traffic, a virtual switching node identifier, and a TSN identifier, the PDU session corresponding to the TSN traffic. In this case, a virtual port identifier is unique on a virtual switching node, and a virtual switching node identifier is unique in a TSN (in other words, different virtual switching nodes in a same TSN have different virtual switching node identifiers). The AF maintains a correspondence among a virtual port identifier, a virtual switching node identifier, a TSN identifier, and a PDU session. In this case, the AF determines a corresponding PDU session based on the identifier of the port that transmits the TSN traffic, the virtual switching node identifier, and the TSN identifier, and uses the PDU session as the PDU session corresponding to the TSN traffic. Similarly, the AF determines, based on the identifier of the port that transmits the TSN traffic, a virtual switching node identifier, and DNN information, the PDU session corresponding to the TSN traffic. Alternatively, the AF determines, based on the identifier of the port that transmits the TSN traffic, a virtual switching node identifier, a TSN identifier, and DNN information, the PDU session corresponding to the TSN traffic.

Manner 6: A UE ID recorded by the AF corresponds to a PDU session of the UE. For example, the UE ID is an IP address or a MAC address corresponding to the PDU session of the UE. When determining, in the foregoing manner, the UE ID corresponding to the TSN traffic, the AF determines the PDU session corresponding to the TSN traffic. Further, when the AF sends the TSN traffic and the corresponding UE ID to the PCF or the SMF, the PCF or the SMF can determine, based on the UE ID, the PDU session corresponding to the TSN traffic.

It can be learned from the foregoing six manners that the AF determines, based on the identifier of the port that transmits the TSN traffic, the PDU session corresponding to the TSN traffic. Alternatively, the AF determines, based on the identifier of the port that transmits the TSN traffic and at least one of the virtual switching node identifier, the TSN identifier, or the DNN information, the PDU session corresponding to the TSN traffic.

Optionally, the AF determines, based on the traffic class of the TSN traffic, a 5QI corresponding to the TSN traffic, and determines, based on the 5G QoS identifier (5QI) corresponding to the TSN traffic, the QoS flow corresponding to the TSN traffic.

After determining the 5QI corresponding to the TSN traffic, the AF may send the 5QI corresponding to the TSN traffic to the SMF. If no QoS flow corresponding to the TSN traffic exists in the existing QoS flow corresponding to the determined UE or in the existing QoS flow corresponding to the determined PDU session, the SMF may create, based on the 5QI corresponding to the TSN traffic, the QoS flow corresponding to the TSN traffic.

After determining the 5QI corresponding to the TSN traffic, the AF sends the 5QI corresponding to the TSN traffic to the PCF, such that the PCF learns of the QoS flow corresponding to the TSN traffic.

That the AF determines, based on the traffic class of the TSN traffic, the 5QI corresponding to the TSN traffic is as follows: a correspondence between a traffic class and a 5QI is configured or stored in the AF, and when receiving the traffic information of the TSN traffic, the AF searches, based on the traffic class of the TSN traffic, for a 5QI corresponding to the traffic class, and the AF determines the 5QI as the 5QI corresponding to the TSN traffic.

Step S103: The AF sends the forwarding policy information of the TSN traffic to the PCF. Correspondingly, the PCF receives the forwarding policy information of the TSN traffic from the AF.

When receiving the forwarding policy information of the TSN traffic from the CNC, the AF sends the forwarding policy information of the TSN traffic to the PCF, to trigger the PCF to create or update the QoS flow corresponding to the TSN traffic. The QoS flow corresponding to the TSN traffic is a QoS flow on which the TSN traffic acts. To be more specific, the QoS flow is limited by the TSN traffic. In other words, deterministic transmission or transmission within a maximum delay needs to be implemented for the QoS flow, or the QoS flow needs to be received and sent within determined time slices or needs to be transmitted within a determined maximum delay. The QoS flow corresponding to the TSN traffic is a QoS flow in the PDU session corresponding to the TSN traffic. If the QoS flow corresponding to the TSN traffic is one of a plurality of existing QoS flows in the PDU session, the PCF is triggered to update the QoS flow. If the QoS flow corresponding to the TSN traffic is not one of a plurality of existing QoS flows in the PDU session, the PCF is triggered to create the QoS flow in the PDU session.

For details about the forwarding policy information that is of the TSN traffic and that is sent by the AF to the PCF, refer to descriptions of the forwarding policy information that is of the TSN traffic and that is sent by the CNC to the AF in step S101. Details are not described herein again. The AF may send the forwarding policy information of the TSN traffic to the PCF through a message channel between the AF and the PCF. The message channel is used to transmit a message between the AF and the PCF.

When the AF performs step S102, the AF further sends the determined UE ID to the PCF, such that the PCF may directly determine, based on the UE ID, the UE corresponding to the TSN traffic. The UE ID and the forwarding policy information of the TSN traffic may be sent together, or may be sent separately. The AF may explicitly indicate the UE ID, or may implicitly indicate the UE ID. For example, the forwarding policy information of the TSN traffic is sent through the message channel between the AF and the PCF. This is not limited herein.

Optionally, the AF further sends at least one of the TSN identifier or the DNN information corresponding to the PDU session to the PCF. The TSN identifier or the DNN information and the forwarding policy information of the TSN traffic may be sent together, or may be sent separately.

Optionally, when the AF determines the PDU session corresponding to the TSN traffic, the AF further sends a PDU session identifier of the PDU session to the PCF. The PDU session identifier can indicate the UE and the PDU session. In this way, using the PDU session identifier, the PCF may directly learn of the UE corresponding to the TSN traffic and the PDU session corresponding to the TSN traffic. The AF may send the PDU session identifier and the forwarding policy information of the TSN traffic to the PCF together. In other words, both the PDU session identifier and the forwarding policy information of the TSN traffic are carried in a same message. Alternatively, the two pieces of information may be sent separately. For example, the forwarding policy information of the TSN traffic is first carried in a message, and then the PDU session identifier is carried in another message.

Optionally, the AF further sends the traffic class and/or the 5QI corresponding to the TSN traffic to the PCF, such that the PCF determines the QoS flow corresponding to the TSN traffic, or the PCF creates a QoS policy of the QoS flow.

Step S104: The PCF determines the UE corresponding to the TSN traffic.

The PCF may determine, in the following several manners, the UE corresponding to the TSN traffic.

Manner 1: The PCF receives the UE ID from the AF, and determines, as the UE corresponding to the TSN traffic, a UE identified by the UE ID.

Manner 2: The PCF receives the PDU session identifier from the AF, and determines, as the UE corresponding to the TSN traffic, a UE indicated by the PDU session identifier.

Manner 3: The PCF determines the PDU session corresponding to the TSN traffic, and determines, as the UE corresponding to the TSN traffic, a UE corresponding to the PDU session.

A premise that the PCF determines the PDU session corresponding to the TSN traffic is that the PCF learns of and records a correspondence between a virtual port identifier and a PDU session. Optionally, the PCF learns of and records a correspondence among a virtual port identifier, a virtual switching node identifier, and a PDU session. Optionally, the PCF learns of and records a correspondence among a virtual port identifier, a TSN identifier, and a PDU session. Optionally, the PCF learns of and records a correspondence among a virtual port identifier, DNN information, and a PDU session.

In a possible implementation, in a scenario in which the UE creates the PDU session, in a process of creating or updating the virtual switching node 1, an SMF may send a virtual port identifier corresponding to the created PDU session to the PCF. When receiving the virtual port identifier, the PCF establishes and records a correspondence between the virtual port identifier and the PDU session. Optionally, the SMF further sends a virtual switching node identifier corresponding to the PDU session to the PCF, such that the PCF establishes and records a correspondence among the virtual port identifier, the virtual switching node identifier, and the PDU session. Optionally, the SMF further sends a TSN identifier corresponding to the PDU session to the PCF, such that the PCF establishes and records a correspondence among the virtual port identifier, the TSN identifier, and the PDU session. Optionally, the SMF further sends DNN information corresponding to the PDU session to the PCF, such that the PCF establishes and records a correspondence among the virtual port identifier, the DNN information, and the PDU session.

In a possible implementation, in a scenario in which the UE creates the PDU session, in a process of creating or updating the virtual switching node 1, the AF may send a virtual port identifier corresponding to the created PDU session to the PCF. When receiving the virtual port identifier, the PCF establishes and records a correspondence between the virtual port identifier and the PDU session. For another optional case, refer to an optional case in the foregoing possible implementation.

The PCF may determine, in the following two manners, the PDU session corresponding to the TSN traffic.

Manner 1: The PCF may determine, in the several manners in which the AF determines the PDU session corresponding to the TSN traffic in step S102, the PDU session corresponding to the TSN traffic.

Manner 2: When the AF sends the PDU session identifier to the PCF, the PCF directly determines, as the PDU session corresponding to the TSN traffic, the PDU session identified by the PDU session identifier.

Step S105: The PCF determines the QoS flow corresponding to the TSN traffic.

For example, the PCF determines, in the QoS flow corresponding to the UE or in the QoS flow corresponding to the PDU session, the QoS flow corresponding to the TSN traffic.

In a possible implementation, the traffic information of the TSN traffic includes the traffic class of the TSN traffic, and the PCF determines, based on the traffic class of the TSN traffic in the existing QoS flow corresponding to the UE, a QoS flow corresponding to the traffic class of the TSN traffic, and determines the QoS flow as the QoS flow corresponding to the TSN traffic. For example, a correspondence between a QoS flow of UE and a TSN traffic class is configured or stored in the PCF, such that the PCF selects, based on the traffic class of the TSN traffic, the QoS flow corresponding to the traffic class of the TSN traffic. Alternatively, a correspondence between a 5G QoS identifier and a TSN traffic class is configured or stored in the PCF, such that the PCF selects, based on the traffic class of the TSN traffic, a 5G QoS identifier corresponding to the traffic class of the TSN traffic, and then uses, as the QoS flow corresponding to the traffic class of the TSN traffic, a QoS flow identified by the 5G QoS identifier.

The PCF determines, in the QoS flow corresponding to the PDU session, the QoS flow corresponding to the TSN traffic. Details may be as follows: 1. The QoS flow corresponding to the TSN traffic is determined in the existing QoS flow corresponding to the PDU session. 2. The QoS flow corresponding to the TSN traffic is created in the PDU session.

The existing QoS flow corresponding to the PDU session may include a QoS flow established in a PDU session creation/modification process, a QoS flow preconfigured in the PDU session, and the like. The PDU session is a PDU session corresponding to the TSN traffic. The PCF may determine, in the following several manners in the existing QoS flow corresponding to the PDU session, the QoS flow corresponding to the TSN traffic.

Manner 1: The traffic information of the TSN traffic includes a destination MAC address of the TSN traffic. The PCF obtains, through screening based on the destination MAC address of the TSN traffic in the existing QoS flow corresponding to the PDU session, a QoS flow having a same destination MAC address as the TSN traffic, and uses the QoS flow as the QoS flow corresponding to the TSN traffic. If a destination MAC address of a QoS flow is the same as the destination MAC address of the TSN traffic, it may be considered that the QoS flow matches the traffic information of the TSN traffic.

The PCF determines the PDU session corresponding to the TSN traffic, and determines, based on the destination MAC address of the TSN traffic in the existing QoS flow corresponding to the PDU session, the QoS flow corresponding to the TSN traffic, such that the QoS flow corresponding to the TSN traffic can be accurately determined. For example, the destination MAC address of the TSN traffic is a MAC address 1, a destination MAC address of a QoS flow 1 corresponding to a PDU session 1 is the MAC address 1, and a destination MAC address of a QoS flow 2 corresponding to a PDU session 2 is the MAC address 1. If matching is directly performed on the destination MAC address of the TSN traffic and the destination MAC address of the QoS flow, the QoS flow 1 and the QoS flow 2 each meet a condition, and the QoS flow 1 and the QoS flow 2 each may be considered as the QoS flow corresponding to the TSN traffic. However, actually, the PDU session corresponding to the TSN traffic is the PDU session 1, and only the QoS flow 1 is the QoS flow corresponding to the TSN traffic. Therefore, accuracy of the determined QoS flow can be ensured by determining the PDU session and determining, in the PDU session, the QoS flow corresponding to the TSN traffic.

Optionally, the PCF obtains, through screening based on the destination MAC address, a VLAN identifier, and a CoS of the TSN traffic in the existing QoS flow corresponding to the PDU session, a QoS flow that has a same destination MAC address, a same VLAN identifier, and a same CoS as the TSN traffic, and uses the QoS flow as the QoS flow corresponding to the TSN traffic.

Manner 2: The traffic information of the TSN traffic includes the traffic class of the TSN traffic, and the PCF determines, based on the traffic class of the TSN traffic in the existing QoS flow corresponding to the PDU session, a QoS flow corresponding to the traffic class of the TSN traffic, and determines the QoS flow as the QoS flow corresponding to the TSN traffic. For example, a correspondence between a QoS flow in a PDU session and a TSN traffic class is configured or stored in the PCF, such that the PCF selects, based on the traffic class of the TSN traffic, the QoS flow corresponding to the traffic class of the TSN traffic. Alternatively, a correspondence between a 5G QoS identifier and a TSN traffic class is configured or stored in the PCF, such that the PCF selects, based on the traffic class of the TSN traffic, a 5G QoS identifier corresponding to the traffic class of the TSN traffic, and then uses, as the QoS flow corresponding to the traffic class of the TSN traffic, a QoS flow identified by the 5G QoS identifier.

Manner 3: The PCF selects, from the existing QoS flow corresponding to the PDU session and based on the time slice for transmitting the TSN traffic, a QoS flow that matches the time slice for transmitting the TSN traffic, and determines the QoS flow as the QoS flow corresponding to the TSN traffic. For example, the PCF determines a time interval between a receive port and a transmit port based on the time slice for transmitting the TSN traffic. For example, a time slice for receiving the TSN traffic by the receive port is t1 to t2, and a time slice for sending the TSN traffic by the transmit port is t3 to t4. In this case, the time interval t between the receive port and the transmit port is t3−t1, t4−t2, or [(t3−t1)+(t4−t2)]/2. Then, a QoS flow that matches the time interval t is obtained through screening from the existing QoS flow corresponding to the PDU session, and the QoS flow is used as the QoS flow corresponding to the TSN traffic. For the QoS flow that matches the time interval t, for example, if a delay of a QoS flow is lower than the time interval t, and a difference between the delay and the time interval t is within a preset range, it may be considered that the QoS flow matches the time interval t. A specific value of the preset range is not limited in this embodiment of this application. A manner of determining the QoS flow that matches the time interval t is not limited in this embodiment of this application. It should be noted that, that the QoS flow corresponding to the TSN traffic is determined based on the time interval between the receive port and the transmit port is an implementation, which does not constitute a limitation on this embodiment of this application. Alternatively, the QoS flow that matches the time slice for transmitting the TSN traffic may be selected in another manner.

Optionally, the PCF selects, from the existing QoS flow corresponding to the PDU session and based on information about a maximum delay of transmitting the TSN traffic, a QoS flow that matches the information about the maximum delay of transmitting the TSN traffic, and determines the QoS flow as the QoS flow corresponding to the TSN traffic. For example, a maximum transmission delay that is of the TSN traffic on the virtual switching node 1 and that is indicated by the information about the maximum delay of transmitting the TSN traffic is T. The PCF obtains, through screening from the existing QoS flow corresponding to the PDU session, a QoS flow that matches the maximum transmission delay T, and uses the QoS flow as the QoS flow corresponding to the TSN traffic. For the QoS flow that matches the maximum transmission delay T, for example, if a delay of a QoS flow is lower than the maximum transmission delay T, and a difference between the delay and the maximum transmission delay T is within a preset range, it may be considered that the QoS flow matches the maximum transmission delay. A specific value of the preset range is not limited in this embodiment of this application.

In the foregoing three manners, the PCF determines, according to the forwarding policy information in the existing QoS flow corresponding to the PDU session, the QoS flow corresponding to the TSN traffic. The PCF may alternatively determine, based on a bandwidth requirement of the TSN traffic in the existing QoS flow corresponding to the PDU session, the QoS flow corresponding to the TSN traffic. For example, the PCF obtains, through screening from the existing QoS flow corresponding to the PDU session, a QoS flow that meets the bandwidth requirement of the TSN traffic, and determines the QoS flow as the QoS flow corresponding to the TSN traffic.

If the existing QoS flow corresponding to the UE or the PDU session includes the QoS flow corresponding to the TSN traffic, the PCF may determine, in the existing QoS flow corresponding to the UE or the PDU session, the QoS flow corresponding to the TSN traffic. If the existing QoS flow corresponding to the UE or the PDU session does not include the QoS flow corresponding to the TSN traffic, the PCF creates, in the UE or the PDU session according to the forwarding policy information of the TSN traffic, the QoS flow corresponding to the TSN traffic.

Step S106: The PCF creates or updates, according to the forwarding policy information, the QoS policy of the QoS flow corresponding to the TSN traffic.

The PCF creates or updates, according to the forwarding policy information of the TSN traffic, the QoS policy of the QoS flow corresponding to the TSN traffic. If the QoS flow that corresponds to the TSN traffic and that is determined in step S105 is the existing QoS flow corresponding to the UE or the PDU session, the PCF updates, according to the forwarding policy information of the TSN traffic, the QoS policy of the QoS flow corresponding to the TSN traffic. If the QoS flow that corresponds to the TSN traffic and that is determined in step S105 is a created QoS flow, the PCF creates, according to the forwarding policy information of the TSN traffic, the QoS policy of the QoS flow corresponding to the TSN traffic. It should be noted that a time difference between the two steps of creating the QoS flow corresponding to the TSN traffic and creating the QoS policy of the QoS flow may be ignored. For example, the QoS policy of the QoS flow is created in a process of creating the QoS flow corresponding to the TSN traffic.

The QoS policy of the QoS flow corresponding to the TSN traffic includes a QoS policy of the QoS flow corresponding to the TSN traffic on a UPF, and further includes a QoS policy of the QoS flow corresponding to the TSN traffic on the UE. In other words, the QoS policy of the QoS flow corresponding to the TSN traffic includes QoS policies of the QoS flow corresponding to the TSN traffic on two sides of the virtual switching node.

That the PCF creates the QoS policy of the QoS flow corresponding to the TSN traffic on the UPF may include the following: The traffic information of the TSN traffic is first used as flow information of the QoS flow corresponding to the TSN traffic, and the traffic information may include a destination MAC address, and optionally may further include a VLAN identifier and/or a CoS. Then, matching is performed on the identifier of the port that transmits the TSN traffic and a plurality of port identifiers on the UPF, to determine a first port identifier for transmitting the TSN traffic on the UPF, and a first port identified by the first port identifier is used as a port that transmits the QoS flow corresponding to the TSN traffic. If time slices for transmitting the TSN traffic by the receive port and the transmit port are determined for the TSN traffic, in other words, the forwarding policy information includes the time slice for transmitting the TSN traffic, the PCF determines, based on the time slice for transmitting the TSN traffic, a time slice corresponding to the first port identifier. For example, the first port is a port that receives the TSN traffic. In this case, a time slice for receiving the TSN traffic by the port that receives the TSN traffic is determined as the time slice corresponding to the first port identifier. Finally, the PCF generates the QoS policy of the QoS flow corresponding to the TSN traffic on the UPF. The QoS policy includes the flow information of the QoS flow corresponding to the TSN traffic and the first port identifier. Optionally, the QoS policy further includes the time slice corresponding to the first port identifier.

If the PDU session of the UE corresponds to a plurality of virtual port identifiers, a process in which the PCF creates the QoS policy of the QoS flow corresponding to the TSN traffic on the UE is the same as a process in which the PCF creates the QoS policy of the QoS flow corresponding to the TSN traffic on the UPF. If the PDU session of the UE corresponds to only one virtual port identifier, the PCF may directly determine, based on the identifier of the port that transmits the TSN traffic, a second port identifier for transmitting the TSN traffic on the UE, optionally determine a time slice corresponding to the second port identifier, and then generate the QoS policy of the QoS flow corresponding to the TSN traffic on the UE. The QoS policy includes the flow information of the QoS flow corresponding to the TSN traffic. Optionally, the QoS policy further includes the time slice corresponding to the second port identifier. More briefly, after generating the QoS policy of the QoS flow corresponding to the TSN traffic on the UPF, the PCF directly generates, based on the flow information and a port identifier and a time slice of another port, the QoS policy of the QoS flow corresponding to the TSN traffic on the UE.

In a process of creating the QoS policy of the QoS flow corresponding to the TSN traffic, the PCF may determine, based on the traffic class of the TSN traffic, a 5G QoS identifier of the QoS flow corresponding to the TSN traffic. For example, a correspondence between a 5G QoS identifier and a TSN traffic class is configured or stored in the PCF, such that a corresponding 5G QoS identifier is selected as the 5G QoS identifier of the QoS flow corresponding to the TSN traffic, based on the traffic class of the TSN traffic.

That the PCF updates the QoS policy of the QoS flow corresponding to the TSN traffic on the UPF may include the following: The traffic information of the TSN traffic is first used as flow information of the QoS flow corresponding to the TSN traffic and is added or updated to the QoS policy of the QoS flow corresponding to the TSN traffic on the UPF. Then, after a first port identifier for transmitting the TSN traffic on the UPF is determined, and optionally a time slice corresponding to the first port identifier is further determined, the first port identifier, and optionally the time slice corresponding to the first port identifier are added or updated to the QoS policy. A process in which the PCF updates the QoS policy of the QoS flow corresponding to the TSN traffic on the UE is the same as a process in which the PCF updates the QoS policy of the QoS flow corresponding to the TSN traffic on the UPF. Likewise, when the PDU session of the UE corresponds to only one virtual port identifier, sending a second port identifier and a corresponding time slice is an optional step.

Step S107: The PCF sends the QoS policy of the QoS flow corresponding to the TSN traffic to the SMF.

Step S108: The SMF sends the QoS policy of the QoS flow corresponding to the TSN traffic on the UPF to the UPF. Correspondingly, the UPF receives, from the SMF, the QoS policy of the QoS flow corresponding to the TSN traffic on the UPF.

For the QoS policy of the QoS flow corresponding to the TSN traffic on the UPF, refer to descriptions in step S107. Details are not described herein again. When receiving the QoS policy of the QoS flow corresponding to the TSN traffic on the UPF, the UPF may control the QoS flow according to the QoS policy.

Step S109: The SMF sends the QoS policy of the QoS flow corresponding to the TSN traffic on the UE to the UE. Correspondingly, the UE receives, from the SMF, the QoS policy of the QoS flow corresponding to the TSN traffic on the UE.

For the QoS policy of the QoS flow corresponding to the TSN traffic on the UE, refer to descriptions in step S107. Details are not described herein again. When receiving the QoS policy of the QoS flow corresponding to the TSN traffic on the UE, the UE may control the QoS flow according to the QoS policy.

The UPF and the UE control, according to the received QoS policies, the QoS flow corresponding to the TSN traffic, such that the QoS flow corresponding to the TSN traffic is received and sent on specified ports, and optionally is further received and sent within specified time slices or is transmitted within a specified maximum delay. In this way, deterministic end-to-end transmission of the QoS flow in the 5G system is implemented. The specified ports are the first port and the second port determined above, and the specified time slices are the time slice corresponding to the first port identifier and the time slice corresponding to the second port identifier.

It should be noted that, in this embodiment of this application, the time slice is represented using a time difference between a start moment and an end moment. This is an implementation, but does not constitute a limitation on this embodiment of this application. For example, the time slice may alternatively be represented using an offset time relative to a start point of a fixed period.

In Embodiment 1 shown in FIG. 5, when receiving the forwarding policy information of the TSN traffic from the CNC, the AF sends the forwarding policy information to the PCF. The PCF first determines the UE corresponding to the TSN traffic, then determines the QoS flow corresponding to the TSN traffic, creates or updates the QoS policy of the QoS flow corresponding to the TSN traffic, and sends the created or updated QoS policy of the QoS flow corresponding to the TSN traffic to the SMF. The SMF delivers the QoS policy to each of the UPF and the UE, such that the QoS flow corresponding to the TSN traffic is received and sent on the specified ports, and optionally is further received and sent within the specified time slices or is transmitted within the specified maximum delay. In this way, deterministic end-to-end transmission of the QoS flow in the 5G system is implemented. It may be understood that, in Embodiment 1 shown in FIG. 5, the forwarding policy information that is of the TSN traffic and that is sent by the AF triggers the PCF to manage the QoS flow corresponding to the TSN traffic.

Figure 6A:
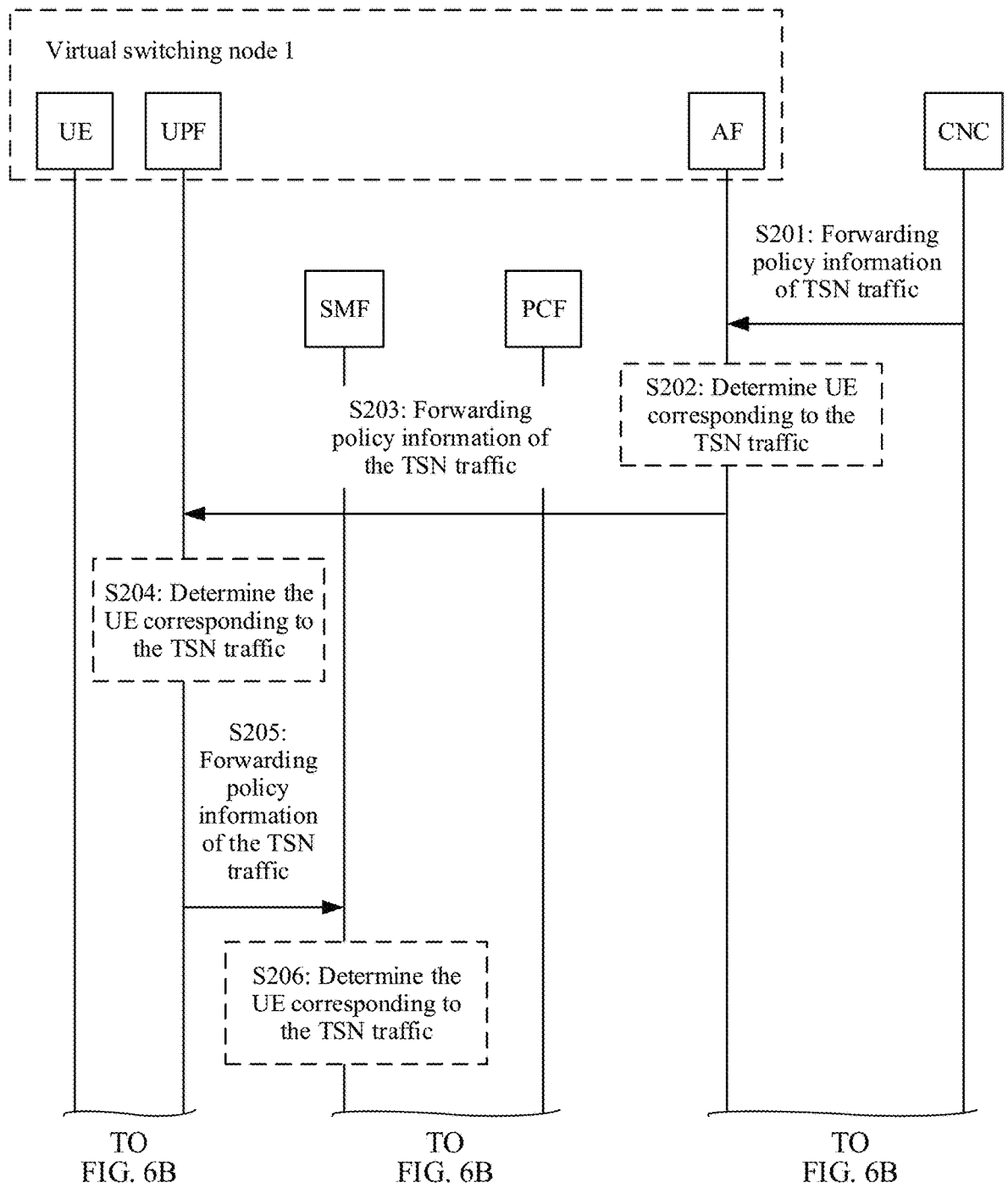
FIG. 6A and FIG. 6B are a schematic flowchart of a time-sensitive networking communication method according to Embodiment 2 of this application.
Figure 6B:
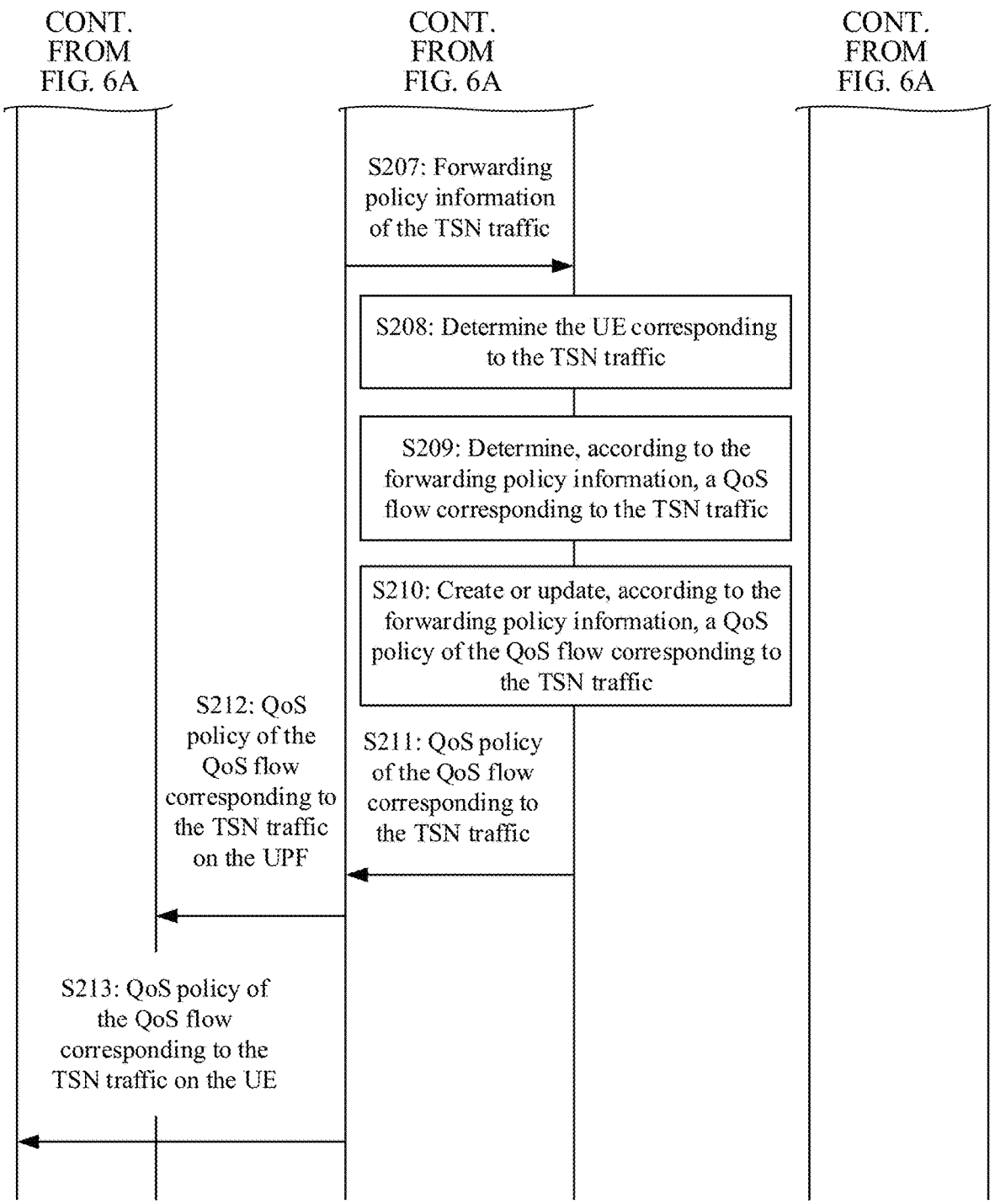

An example in which an embodiment of this application is applied to the schematic diagram of the network architecture shown in FIG. 4B is used. FIG. 6A and FIG. 6B are a schematic flowchart of a time-sensitive networking communication method according to Embodiment 2 of this application. The embodiment shown in FIG. 6A and FIG. 6B may include but is not limited to the following steps.

Step S201: A CNC sends forwarding policy information of TSN traffic to an AF. Correspondingly, the AF receives the forwarding policy information of the TSN traffic from the CNC.

Step S202: The AF determines a UE corresponding to the TSN traffic.

For an implementation process of step S201 and step S202, refer to descriptions of step S101 and step S102 in the embodiment shown in FIG. 5. Details are not described herein again.

Step S203: The AF sends the forwarding policy information of the TSN traffic to a UPF. Correspondingly, the UPF receives the forwarding policy information of the TSN traffic from the AF.

For example, the AF sends the forwarding policy information of the TSN traffic to a UPF in a virtual switching node 1.

Optionally, the AF further sends at least one of a TSN identifier or DNN information to the UPF. The TSN identifier or the DNN information and the forwarding policy information of the TSN traffic may be sent together, or may be sent separately.

Optionally, when the AF performs step S202, the AF further sends a UE ID of the determined UE to the UPF, such that the UPF may directly learn of, using the UE ID, the UE corresponding to the TSN traffic.

Step S204: The UPF determines the UE corresponding to the TSN traffic. Step S204 is an optional step.

By determining a PDU session corresponding to the TSN traffic, the UPF may determine the UE corresponding to the TSN traffic.

A premise that the UPF determines the PDU session corresponding to the TSN traffic is that the UPF learns of a correspondence between a virtual port identifier and a PDU session. Optionally, the UPF learns of a correspondence among a virtual port identifier, a virtual switching node identifier, and a PDU session. Optionally, the UPF learns of a correspondence among a virtual port identifier, a TSN identifier, and a PDU session. Optionally, the UPF learns of a correspondence among a virtual port identifier, DNN information, and a PDU session.

In a possible implementation, in a scenario in which the UE creates the PDU session, in a process of creating or updating the virtual switching node 1, an SMF may send a virtual port identifier corresponding to the created PDU session to the UPF. When receiving the virtual port identifier, the UPF establishes and records a correspondence between the virtual port identifier and the PDU session. The virtual port identifier that corresponds to the PDU session and that is sent by the SMF to the UPF may be a virtual port identifier allocated by the SMF to the PDU session, or may be sent by the AF to the SMF after the AF allocates the virtual port identifier to the PDU session. There may be one or more virtual port identifiers corresponding to the PDU session.

Optionally, the SMF further sends a virtual switching node identifier corresponding to the PDU session to the UPF, such that the UPF establishes and records a correspondence among the virtual port identifier, the virtual switching node identifier, and the PDU session. Optionally, the SMF further sends a TSN identifier corresponding to the PDU session to the UPF, such that the UPF establishes and records a correspondence among the virtual port identifier, the TSN identifier, and the PDU session. Optionally, the SMF further sends DNN information corresponding to the PDU session to the UPF, such that the UPF establishes and records a correspondence among the virtual port identifier, the DNN information, and the PDU session.

In a possible implementation, in a scenario in which the UE creates the PDU session, in a process of creating or updating the virtual switching node 1, when the UPF receives a request message from the SMF, the request message is used to request the UPF to allocate a virtual port identifier to the PDU session, and the UPF allocates a virtual port identifier to the PDU session, and records a correspondence between the PDU session and the virtual port identifier.

The UPF may determine, in the following two manners, the PDU session corresponding to the TSN traffic.

Manner 1: The UPF may determine, in the several manners in which the AF determines the PDU session corresponding to the TSN traffic in step S102, the PDU session corresponding to the TSN traffic.

Manner 2: When the AF sends a PDU session identifier to the UPF, the UPF directly determines, as the PDU session corresponding to the TSN traffic, a PDU session identified by the PDU session identifier.

Optionally, the UPF further determines a QoS flow corresponding to the TSN traffic. For details, refer to the method for determining, by the AF, the QoS flow corresponding to the TSN traffic in step S102.

Step S205: The UPF sends the forwarding policy information of the TSN traffic to the SMF. Correspondingly, the SMF receives the forwarding policy information of the TSN traffic from the UPF.

For example, the UPF sends the forwarding policy information of the TSN traffic to an SMF corresponding to the determined PDU session. The UPF may send the forwarding policy information of the TSN traffic to the SMF through a message channel corresponding to a PDU session between the UPF and the SMF. The message channel is used to transmit a message between the UPF and the SMF.

Optionally, the UPF further sends at least one of a TSN identifier or DNN information to the SMF. The TSN identifier or the DNN information and the forwarding policy information of the TSN traffic may be sent together, or may be sent separately.

Optionally, when the UPF performs step S204, the UPF further sends the PDU session identifier of the determined PDU session to the SMF, such that the SMF can directly learn of, using the PDU session identifier, the PDU session corresponding to the TSN traffic, in order to learn of the UE corresponding to the TSN traffic. The UPF may explicitly indicate the PDU session identifier, or may implicitly indicate the PDU session identifier. For example, the forwarding policy information of the TSN traffic is sent through the message channel corresponding to the PDU session between the UPF and the SMF. This is not limited herein.

Step S206: The SMF determines the UE corresponding to the TSN traffic. Step S206 is an optional step.

By determining the PDU session corresponding to the TSN traffic, the SMF may determine the UE corresponding to the TSN traffic.

A premise that the SMF determines the PDU session corresponding to the TSN traffic is that the SMF learns of the correspondence between a virtual port identifier and a PDU session. Optionally, the SMF learns of the correspondence among a virtual port identifier, a virtual switching node identifier, and a PDU session. Optionally, the SMF learns of the correspondence among a virtual port identifier, a TSN identifier, and a PDU session. Optionally, the SMF learns of the correspondence among a virtual port identifier, DNN information, and a PDU session.

In a possible implementation, in a scenario in which the UE creates the PDU session, in a process of creating or updating the virtual switching node 1, the SMF allocates a virtual port identifier to the PDU session, and records a correspondence between the PDU session and the virtual port identifier. The SMF may allocate one or more virtual port identifiers.

In a possible implementation, in a scenario in which the UE creates the PDU session, in a process of creating or updating the virtual switching node 1, the SMF receives, from the AF or the UPF, a virtual port identifier corresponding to the PDU session, and establishes and records a correspondence between the virtual port identifier and the PDU session. The virtual port identifier corresponding to the PDU session may be allocated by the AF to the PDU session, or may be allocated by the UPF to the PDU session.

The SMF may determine, in the following two manners, the PDU session corresponding to the TSN traffic.

Manner 1: The SMF may determine, in the several manners in which the AF determines the PDU session corresponding to the TSN traffic in step S102, the PDU session corresponding to the TSN traffic.

Manner 2: When the UPF sends the PDU session identifier to the SMF, the SMF directly determines, as the PDU session corresponding to the TSN traffic, the PDU session identified by the PDU session identifier.

Optionally, the SMF further determines the QoS flow corresponding to the TSN traffic. For details, refer to the method for determining, by the AF, the QoS flow corresponding to the TSN traffic in step S102.

Step S207: The SMF sends the forwarding policy information of the TSN traffic to a PCF. Correspondingly, the PCF receives the forwarding policy information of the TSN traffic from the SMF.

Optionally, the SMF further sends at least one of a TSN identifier or DNN information to the PCF. The TSN identifier or the DNN information and the forwarding policy information of the TSN traffic may be sent together, or may be sent separately.

Optionally, when the SMF performs step S206, the SMF further sends the PDU session identifier of the determined PDU session to the PCF, such that the PCF can directly learn of, using the PDU session identifier, the PDU session corresponding to the TSN traffic, in order to learn of the UE corresponding to the TSN traffic.

Step S208: The PCF determines the UE corresponding to the TSN traffic.

The PCF may determine, in the following several manners, the UE corresponding to the TSN traffic.

Manner 1: The PCF receives the UE ID from the SMF, and determines, as the UE corresponding to the TSN traffic, a UE identified by the UE ID.

Manner 2: The PCF receives the PDU session identifier from the SMF, and determines, as the UE corresponding to the TSN traffic, a UE indicated by the PDU session identifier.

Manner 3: The PCF determines the PDU session corresponding to the TSN traffic, and determines, as the UE corresponding to the TSN traffic, a UE corresponding to the PDU session.

The PCF may determine, in the several manners in which the AF determines the PDU session corresponding to the TSN traffic in step S102, the PDU session corresponding to the TSN traffic.

Step S209: The PCF determines, according to the forwarding policy information, the QoS flow corresponding to the TSN traffic.

Step S210: The PCF creates or updates, according to the forwarding policy information, a QoS policy of the QoS flow corresponding to the TSN traffic.

Step S211: The PCF sends the QoS policy of the QoS flow corresponding to the TSN traffic to the SMF.

Step S212: The SMF sends a QoS policy of the QoS flow corresponding to the TSN traffic on the UPF to the UPF. Correspondingly, the UPF receives, from the SMF, the QoS policy of the QoS flow corresponding to the TSN traffic on the UPF.

Step S213: The SMF sends a QoS policy of the QoS flow corresponding to the TSN traffic on the UE to the UE. Correspondingly, the UE receives, from the SMF, the QoS policy of the QoS flow corresponding to the TSN traffic on the UE.

For an implementation process of step S209 to step S213, refer to descriptions of step S105 to step S109 in the embodiment shown in FIG. 5. Details are not described herein again.

In Embodiment 2 shown in FIG. 6A and FIG. 6B, when receiving the forwarding policy information of the TSN traffic from the CNC, the AF sends the forwarding policy information to the UPF, and the UPF sends the forwarding policy information to the SMF. Then, the SMF sends the forwarding policy information to the PCF. When receiving the forwarding policy information of the TSN traffic, the PCF first determines the UE corresponding to the TSN traffic, then determines the QoS flow corresponding to the TSN traffic, creates or updates the QoS policy of the QoS flow corresponding to the TSN traffic, and sends the created or updated QoS policy of the QoS flow corresponding to the TSN traffic to the SMF. The SMF delivers the QoS policy to each of the UPF and the UE, such that the QoS flow corresponding to the TSN traffic is received and sent on specified ports, and optionally is further received and sent within specified time slices or is transmitted within a specified maximum delay. In this way, deterministic end-to-end transmission of the QoS flow in a 5G system is implemented. It may be understood that, in Embodiment 2 shown in FIG. 6A and FIG. 6B, the forwarding policy information that is of the TSN traffic and that is sent by the SMF triggers the PCF to manage the QoS flow corresponding to the TSN traffic.

Figure 7A:
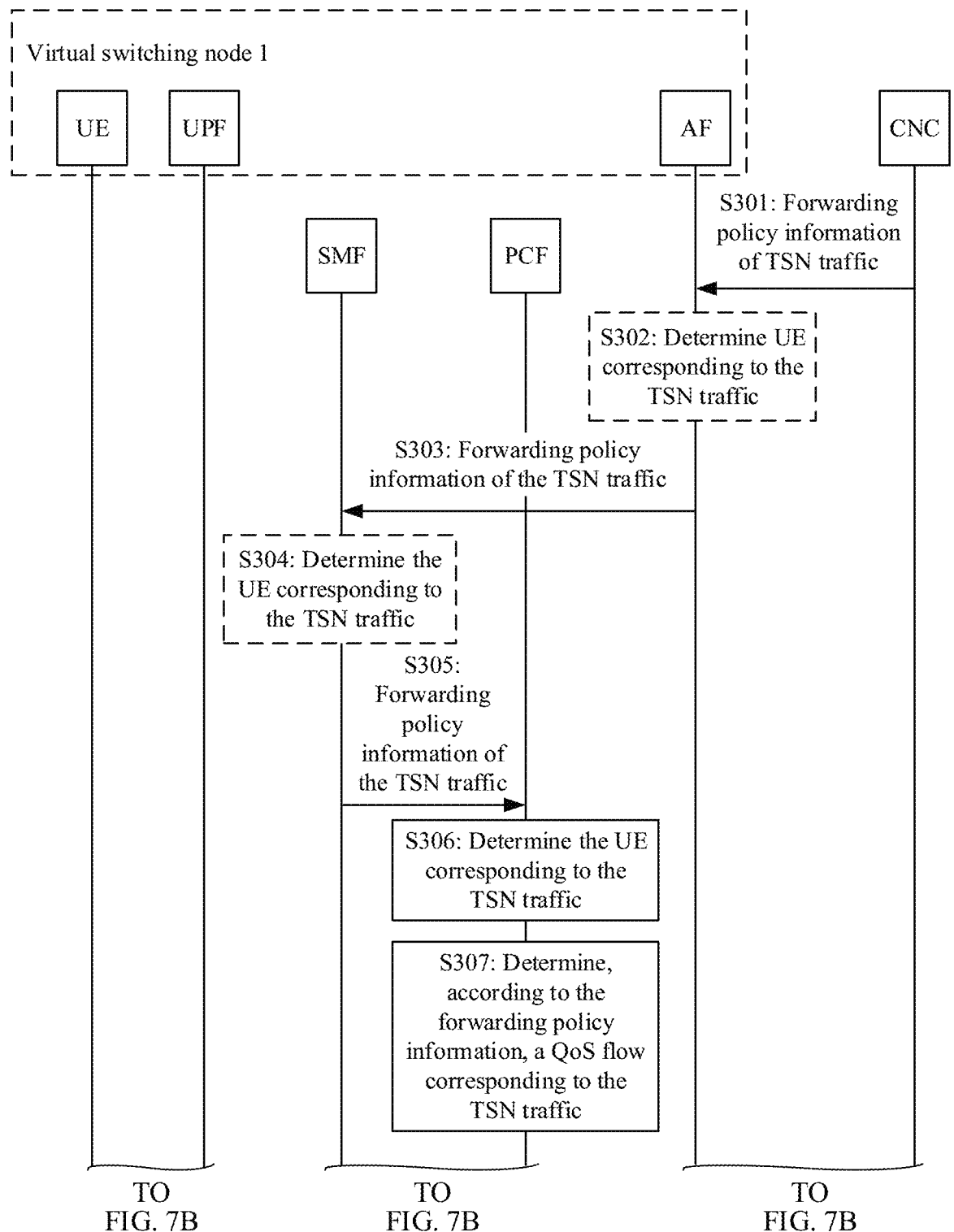
FIG. 7A and FIG. 7B are a schematic flowchart of a time-sensitive networking communication method according to Embodiment 3 of this application.
Figure 7B:
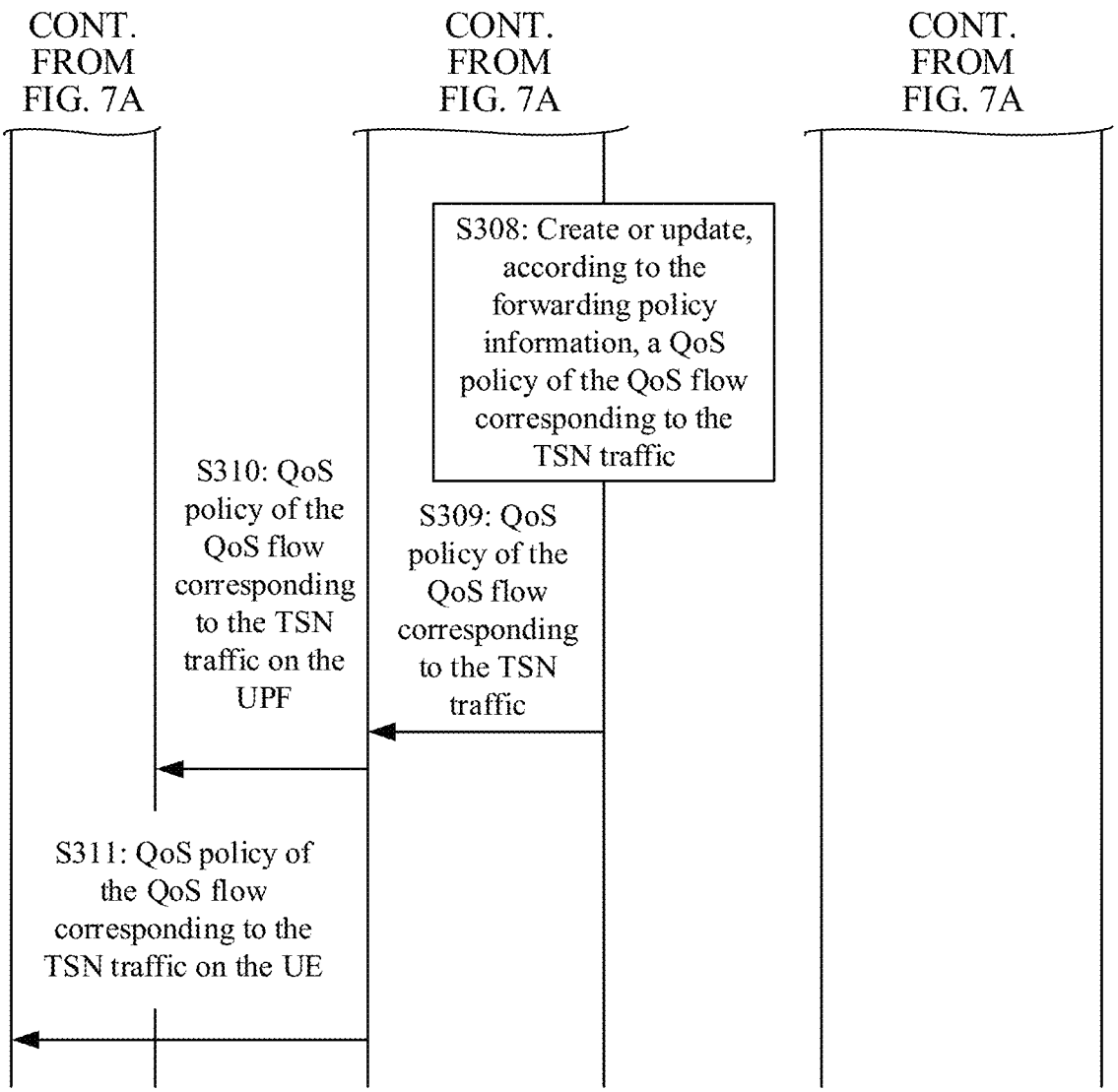

An example in which an embodiment of this application is applied to the schematic diagram of the network architecture shown in FIG. 4B is used. FIG. 7A and FIG. 7B are a schematic flowchart of a time-sensitive networking communication method according to Embodiment 3 of this application. The embodiment shown in FIG. 7A and FIG. 7B may include but is not limited to the following steps.

Step S301: A CNC sends forwarding policy information of TSN traffic to an AF. Correspondingly, the AF receives the forwarding policy information of the TSN traffic from the CNC.

Step S302: The AF determines a UE corresponding to the TSN traffic. Optionally, the AF further determines a QoS flow corresponding to the TSN traffic.

For an implementation process of step S301 and step S302, refer to descriptions of step S101 and step S102 in the embodiment shown in FIG. 5. Details are not described herein again.

Step S303: The AF sends the forwarding policy information of the TSN traffic to an SMF. Correspondingly, the SMF receives the forwarding policy information of the TSN traffic from the AF.

Before performing step S303, the AF needs to first determine a specific SMF to which the forwarding policy information of the TSN traffic is to be sent. The AF may determine, in the following several manners, the specific SMF to which the forwarding policy information of the TSN traffic is to be sent.

Manner 1: The AF determines, based on a virtual port identifier, the SMF to which the forwarding policy information of the TSN traffic is to be sent. For example, the AF determines, based on the virtual port identifier, a PDU session corresponding to the virtual port identifier, that is, a PDU session corresponding to the TSN traffic, and then determines an SMF corresponding to the PDU session.

Optionally, the AF determines, based on the virtual port identifier and a virtual switching node, the SMF to which the forwarding policy information of the TSN traffic is to be sent. Optionally, the AF determines, based on the virtual port identifier and a TSN identifier, the SMF to which the forwarding policy information of the TSN traffic is to be sent. Optionally, the AF determines, based on the virtual port identifier and DNN information, the SMF to which the forwarding policy information of the TSN traffic is to be sent. Optionally, the AF determines, based on the virtual port identifier, a virtual switching node, and a TSN identifier, the SMF to which the forwarding policy information of the TSN traffic is to be sent. Optionally, the AF determines, based on the virtual port identifier, a virtual switching node, and DNN information, the SMF to which the forwarding policy information of the TSN traffic is to be sent. Optionally, the AF determines, based on the virtual port identifier, a virtual switching node, DNN information, and a TSN identifier, the SMF to which the forwarding policy information of the TSN traffic is to be sent. The AF may determine the TSN identifier based on a VLAN identifier and CoS information that are included in traffic information of the TSN traffic.

Manner 2: After determining a PDU session corresponding to the TSN traffic, the AF sends a message to an NEF, and the message carries identifier information of the PDU session, for example, a MAC address of the PDU session or a PDU session identifier. Then, the NEF determines, based on the identifier information of the PDU session, an SMF corresponding to the PDU session, and then the NEF notifies the AF of the determined SMF.

Optionally, the AF further sends at least one of a TSN identifier or DNN information to the SMF. The TSN identifier or the DNN information and the forwarding policy information of the TSN traffic may be sent together, or may be sent separately.

Optionally, when the AF performs step S302, the AF further sends the PDU session identifier of the determined PDU session or a UE ID to the SMF, such that the SMF can directly learn of, using the PDU session identifier, the PDU session corresponding to the TSN traffic, in order to learn of the UE corresponding to the TSN traffic.

Step S304: The SMF determines the UE corresponding to the TSN traffic. Optionally, the SMF further determines the QoS flow corresponding to the TSN traffic.

Step S305: The SMF sends the forwarding policy information of the TSN traffic to a PCF. Correspondingly, the PCF receives the forwarding policy information of the TSN traffic from the SMF.

Step S306: The PCF determines the UE corresponding to the TSN traffic.

For an implementation process of step S304 to step S306, refer to descriptions of step S206 to step S208 in the embodiment shown in FIG. 6A and FIG. 6B. Details are not described herein again.

Step S307: The PCF determines the QoS flow corresponding to the TSN traffic.

Step S308: The PCF creates or updates, according to the forwarding policy information, a QoS policy of the QoS flow corresponding to the TSN traffic.

Step S309: The PCF sends the QoS policy of the QoS flow corresponding to the TSN traffic to the SMF.

Step S310: The SMF sends a QoS policy of the QoS flow corresponding to the TSN traffic on a UPF to the UPF. Correspondingly, the UPF receives, from the SMF, the QoS policy of the QoS flow corresponding to the TSN traffic on the UPF.

Step S311: The SMF sends a QoS policy of the QoS flow corresponding to the TSN traffic on the UE to the UE. Correspondingly, the UE receives, from the SMF, the QoS policy of the QoS flow corresponding to the TSN traffic on the UE.

For an implementation process of step S307 to step S311, refer to descriptions of step S105 to step S109 in the embodiment shown in FIG. 5. Details are not described herein again.

In Embodiment 3 shown in FIG. 7A and FIG. 7B, when receiving the forwarding policy information of the TSN traffic from the CNC, the AF sends the forwarding policy information to the SMF. Then, the SMF sends the forwarding policy information to the PCF. When receiving the forwarding policy information of the TSN traffic, the PCF first determines the UE corresponding to the TSN traffic, then determines the QoS flow corresponding to the TSN traffic, creates or updates the QoS policy of the QoS flow corresponding to the TSN traffic, and sends the created or updated QoS policy of the QoS flow corresponding to the TSN traffic to the SMF. The SMF delivers the QoS policy to each of the UPF and the UE, such that the QoS flow corresponding to the TSN traffic is received and sent on specified ports, and optionally is further received and sent within specified time slices or is transmitted within a specified maximum delay. In this way, deterministic end-to-end transmission of the QoS flow in a 5G system is implemented. It may be understood that, in Embodiment 3 shown in FIG. 7A and FIG. 7B, the forwarding policy information that is of the TSN traffic and that is sent by the SMF triggers the PCF to manage the QoS flow corresponding to the TSN traffic. A difference from Embodiment 2 lies in that the forwarding policy information sent by the SMF to the PCF is directly from the AF in Embodiment 3, while the forwarding policy information sent by the SMF to the PCF is from the UPF and the forwarding policy information sent by the UPF to the SMF is from the AF in Embodiment 2.

Figure 8A:
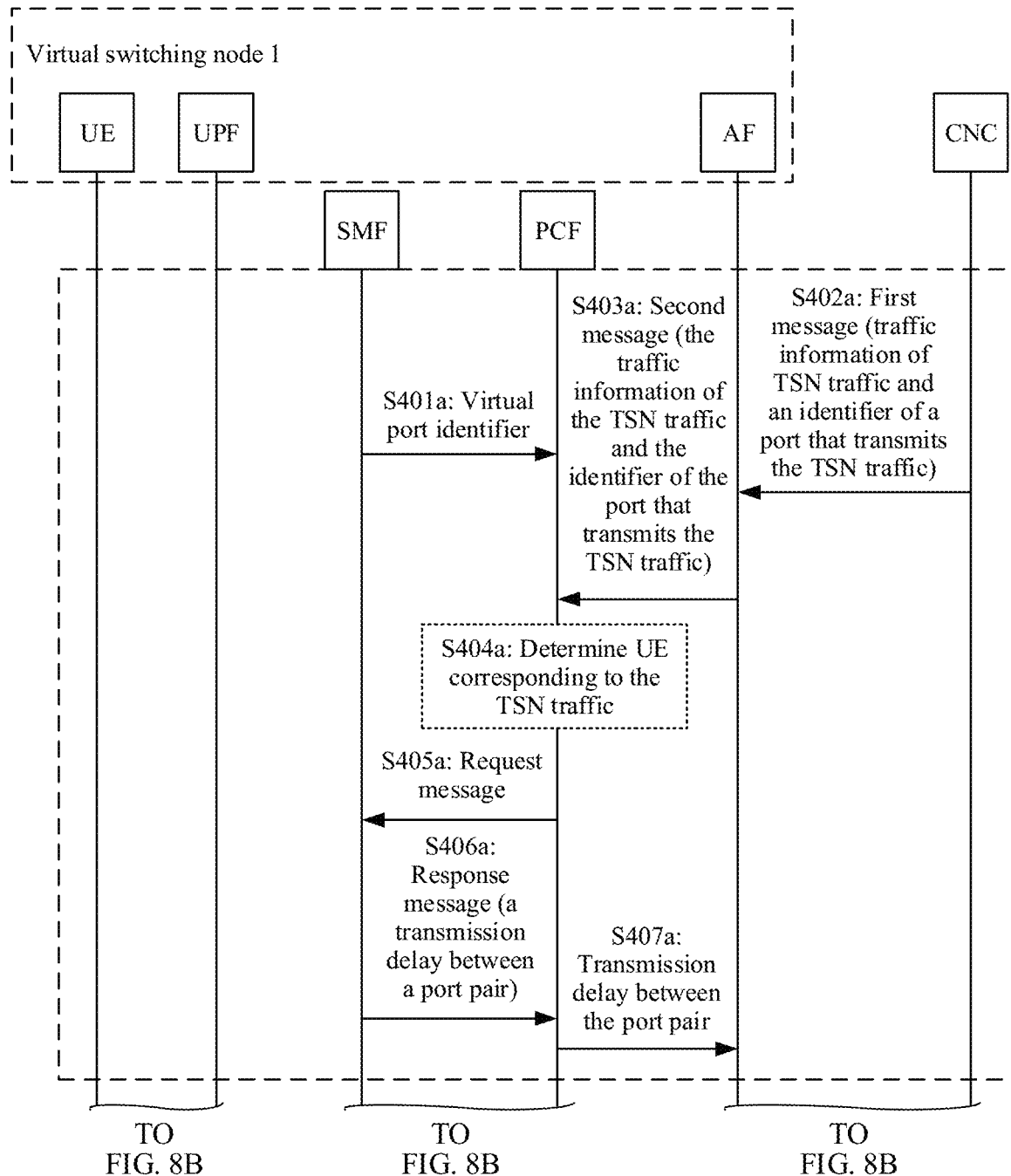
FIG. 8A and FIG. 8B are a schematic flowchart of a time-sensitive networking communication method according to Embodiment 4 of this application.
Figure 8B:
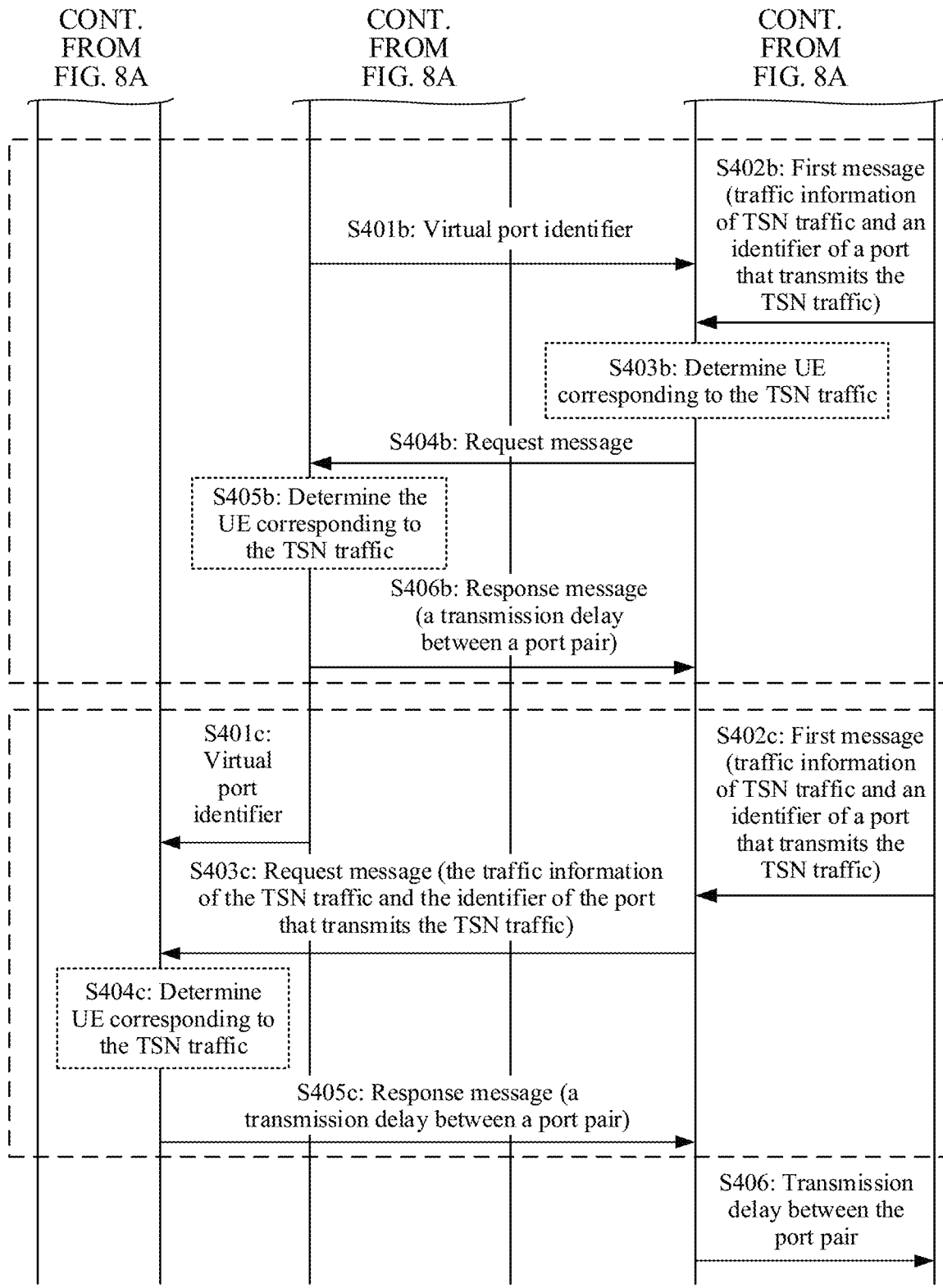

An example in which an embodiment of this application is applied to the schematic diagram of the network architecture shown in FIG. 4B is used. FIG. 8A and FIG. 8B are a schematic flowchart of a time-sensitive networking communication method according to Embodiment 4 of this application. The embodiment shown in FIG. 8A and FIG. 8B may include but is not limited to the following steps.

Step S401a: In a process in which a UE creates a PDU session, an SMF sends a virtual port identifier corresponding to the PDU session to a PCF. Correspondingly, the PCF receives, from the SMF, the virtual port identifier corresponding to the PDU session.

In the process in which the UE creates the PDU session, the SMF may allocate a virtual port identifier to the PDU session, an AF may allocate a virtual port identifier to the PDU session, or a UPF may allocate a virtual port identifier to the PDU session. The virtual port identifier allocated by the SMF to the PDU session may be directly sent to the PCF. The virtual port identifier allocated by the AF or the UPF to the PDU session may be sent to the SMF, and the SMF sends the virtual port identifier corresponding to the PDU session to the PCF.

When receiving the virtual port identifier corresponding to the PDU session, the PCF records a correspondence between the PDU session and the virtual port identifier.

Optionally, the SMF further sends a virtual switching node identifier corresponding to the PDU session to the PCF, and the PCF records a correspondence among the PDU session, the virtual port identifier, and the virtual switching node identifier. Optionally, the SMF further sends DNN information corresponding to the PDU session to the PCF, and the PCF records a correspondence among the PDU session, the virtual port identifier, and the DNN information. Optionally, the SMF further sends a TSN identifier corresponding to the PDU session to the PCF, and the PCF records a correspondence among the PDU session, the virtual port identifier, and the TSN identifier. Optionally, the SMF further sends a port identifier that is of a UPF and that corresponds to the PDU session to the PCF, and the PCF records a correspondence among the PDU session, the virtual port identifier, and the port identifier of the UPF.

Step S402a: A CNC sends a first message to the AF, where the first message includes traffic information of TSN traffic and an identifier of a port that transmits the TSN traffic. Correspondingly, the AF receives the first message from the CNC.

For the traffic information of the TSN traffic and the identifier of the port that transmits the TSN traffic, refer to descriptions of the traffic information of the TSN traffic and the identifier of the port that transmits the TSN traffic in step S101 in the embodiment shown in FIG. 5.

Step S403a: The AF sends a second message to the PCF, where the second message includes the traffic information of the TSN traffic and the identifier of the port that transmits the TSN traffic. Correspondingly, the PCF receives the second message from the AF.

The second message is used to request to obtain a transmission delay between a port pair corresponding to the identifier of the port that transmits the TSN traffic, and the second message further includes the traffic information of the TSN traffic. The method is used in a scenario in which a virtual switching node provides different transmission delays for different flows. For example, for different QoS flows in a PDU session, the virtual switching node performs transmission on different transmission paths, such that transmission delays of the different QoS flows in the virtual switching node are different. Therefore, in this scenario, a QoS flow needs to be first determined, and then a transmission delay corresponding to the QoS flow is determined.

Optionally, the second message further includes at least one of a virtual switching node identifier, a TSN identifier, DNN information, or a UPF port identifier corresponding to the PDU session.

Step S404a: The PCF determines UE corresponding to the TSN traffic. Step S404a is an optional step. Optionally, the PCF further determines a QoS flow corresponding to the TSN traffic.

Step S405a: The PCF sends a request message to the SMF, where the request message includes the identifier of the port that transmits the TSN traffic, and optionally further includes flow information of the QoS flow corresponding to the TSN traffic. Correspondingly, the SMF receives the request message from the PCF.

The request message is used to request the SMF to obtain the transmission delay between the port pair corresponding to the identifier of the port that transmits the TSN traffic. When receiving the request message, the SMF determines the port pair based on the identifier of the port that transmits the TSN traffic, and determines the transmission delay between the port pair, to obtain the transmission delay between the port pair. A specific manner in which the SMF determines the transmission delay between the port pair is not limited in this embodiment of this application.

The request message further includes the flow information of the QoS flow corresponding to the TSN traffic, such that the SMF can identify the QoS flow based on the flow information.

Step S406a: The SMF sends a response message to the PCF, where the response message includes the transmission delay between the port pair. Correspondingly, the PCF receives the response message from the SMF.

Step S407a: The PCF sends the transmission delay between the port pair to the AF. Correspondingly, the AF receives the transmission delay between the port pair from the PCF.

Step S401a to step S407a are Manner 1 of obtaining the transmission delay between the port pair.

Step S401b: In a process in which a UE creates a PDU session, an SMF sends a virtual port identifier corresponding to the PDU session to an AF. Correspondingly, the AF receives, from the SMF, the virtual port identifier corresponding to the PDU session.

Step S402b: A CNC sends a first message to the AF, where the first message includes traffic information of TSN traffic and an identifier of a port that transmits the TSN traffic. Correspondingly, the AF receives the first message from the CNC.

Step S403b: The AF determines UE corresponding to the TSN traffic. Step S403b is an optional step.

Step S404b: The AF sends a request message to the SMF, where the request message includes the identifier of the port that transmits the TSN traffic. Correspondingly, the SMF receives the request message from the AF.

Step S405b: The SMF determines the UE corresponding to the TSN traffic. Step S405b is an optional step. Optionally, the SMF further determines a QoS flow corresponding to the TSN traffic.

Step S406b: The SMF sends a response message to the AF, where the response message includes a transmission delay between a port pair. Correspondingly, the AF receives the response message from the SMF.

Step S401b to step S406b are Manner 2 of obtaining the transmission delay between the port pair.

Step S401c: In a process in which a UE creates a PDU session, an SMF sends a virtual port identifier corresponding to the PDU session to a UPF. Correspondingly, the UPF receives, from the SMF, the virtual port identifier corresponding to the PDU session.

Step S402c: A CNC sends a first message to an AF, where the first message includes traffic information of TSN traffic and an identifier of a port that transmits the TSN traffic. Correspondingly, the AF receives the first message from the CNC.

Step S403c: The AF sends a request message to the UPF, where the request message includes the traffic information of the TSN traffic and the identifier of the port that transmits the TSN traffic. Correspondingly, the UPF receives the request message from the AF.

The request message is used to request a transmission delay between a port pair corresponding to the identifier of the port that transmits the TSN traffic.

Step S404c: The UPF determines a UE corresponding to the TSN traffic. Step S404c is an optional step. Optionally, the UPF further determines a QoS flow corresponding to the TSN traffic.

When receiving the request message, the UPF determines the port pair based on the identifier of the port that transmits the TSN traffic, and measures the transmission delay between the port pair, to obtain the transmission delay between the port pair. A specific manner in which the UPF performs measurement is not limited in this embodiment of this application.

Step S405c: The UPF sends a response message to the AF, where the response message includes the transmission delay between the port pair. Correspondingly, the AF receives the response message from the UPF.

Step S401c to step S405c are Manner 3 of obtaining the transmission delay between the port pair.

It should be noted that step S401a to step S407a are a process in which the AF obtains the transmission delay between the port pair from the SMF through the PCF, step S401b to step S406b are a process in which the AF obtains the transmission delay between the port pair from the SMF, and step S401c to step S405c are a process in which the AF obtains the transmission delay between the port pair from the UPF.

Step S406: The AF sends the transmission delay between the port pair to the CNC.

After receiving the transmission delay between the port pair, the AF uses the transmission delay between the port pair as delay information of a port pair of a virtual switching node 1, and sends the delay information to the CNC.

When receiving the delay information of the port pair of the virtual switching node 1, the CNC may determine, based on the delay information of the port pair of the virtual switching node 1 with reference to delay information of each switching node on a transmission path of the TSN traffic in a TSN, a time slice for transmitting the TSN traffic by the virtual switching node 1 or information about a maximum delay of transmitting the TSN traffic by the virtual switching node 1. For example, the CNC determines delay requirements or time window requirements of transmitting the TSN traffic that are of a receive end and a transmit end, and calculates, based on a processing delay range and a transmission delay of each switching node, a time slice for transmitting the TSN traffic by each switching node. In this way, the calculated time slice for transmitting the TSN traffic is within the processing delay range of each switching node, and a sum of delays in time slices for transmitting the TSN traffic by all switching nodes and a sum of transmission delays meet a delay requirement of a data terminal for the TSN traffic or a time window requirement of transmitting the TSN traffic. When determining the time slice for transmitting the TSN traffic by the virtual switching node 1 or the information about the maximum delay of transmitting the TSN traffic by the virtual switching node 1, the CNC may generate forwarding policy information of the TSN traffic on the virtual switching node 1. The generated forwarding policy information includes traffic information of the TSN traffic, the identifier of the port that transmits the TSN traffic, and the time slice for transmitting the TSN traffic, or includes traffic information of the TSN traffic, the identifier of the port that transmits the TSN traffic, and the information about the maximum delay of transmitting the TSN traffic. Then, the CNC delivers the forwarding policy information to the virtual switching node 1, to perform the embodiment shown in FIG. 5, FIG. 6A and FIG. 6B, or FIG. 7A and FIG. 7B.

It may be understood that Embodiment 4 shown in FIG. 8A and FIG. 8B is performed before the embodiment shown in FIG. 5, FIG. 6A and FIG. 6B, or FIG. 7A and FIG. 7B, and is a process about how the CNC generates the forwarding policy information of the TSN traffic on the virtual switching node 1.

The foregoing describes in detail the methods in the embodiments of this application. The following provides an apparatus in the embodiments of this application.

Figure 9:
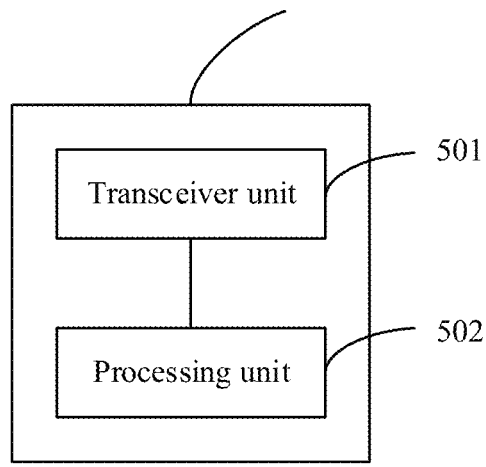
FIG. 9 is a schematic diagram of a logical structure of a communications apparatus according to an embodiment of this application.

FIG. 9 is a schematic diagram of a logical structure of a communications apparatus 50 according to an embodiment of this application. The communications apparatus 50 may include a transceiver unit 501 and a processing unit 502. The communications apparatus 50 is a time-sensitive networking communications apparatus, and may be a policy control network element or an application function network element.

A case in which the communications apparatus 50 is the policy control network element is as follows:

The transceiver unit 501 is configured to receive forwarding policy information of TSN traffic, where the forwarding policy information of the TSN traffic is used to trigger the policy control network element to manage a QoS flow corresponding to the TSN traffic.

The processing unit 502 is configured to: determine a user terminal corresponding to the TSN traffic; determine, in a QoS flow corresponding to the user terminal, the QoS flow corresponding to the TSN traffic; and create or update, according to the forwarding policy information of the TSN traffic, a QoS policy of the QoS flow corresponding to the TSN traffic. The transceiver unit is further configured to send the created or updated QoS policy of the QoS flow corresponding to the TSN traffic to a session management network element.

When the communications apparatus 50 is the policy control network element, functions of the PCF in the embodiments shown in FIG. 5 to FIG. 8A and FIG. 8B may be implemented. For a detailed process performed by each unit in the communications apparatus 50, refer to the steps performed by the PCF in the embodiments shown in FIG. 5 to FIG. 8A and FIG. 8B. Details are not described herein again.

A case in which the communications apparatus 50 is the application function network element is as follows.

The transceiver unit 501 is configured to receive forwarding policy information of TSN traffic, where the forwarding policy information of the TSN traffic includes traffic information of the TSN traffic and an identifier of a port that transmits the TSN traffic.

The processing unit 502 is configured to determine, based on the identifier of the port that transmits the TSN traffic, a user terminal identifier corresponding to the TSN traffic. The transceiver unit is further configured to send the user terminal identifier corresponding to the TSN traffic to a policy control network element.

When the communications apparatus 50 is the application function network element, functions of the AF in the embodiments shown in FIG. 5 to FIG. 8A and FIG. 8B may be implemented. For a detailed process performed by each unit in the communications apparatus 50, refer to the steps performed by the AF in the embodiments shown in FIG. 5 to FIG. 8A and FIG. 8B. Details are not described herein again.

Figure 10:
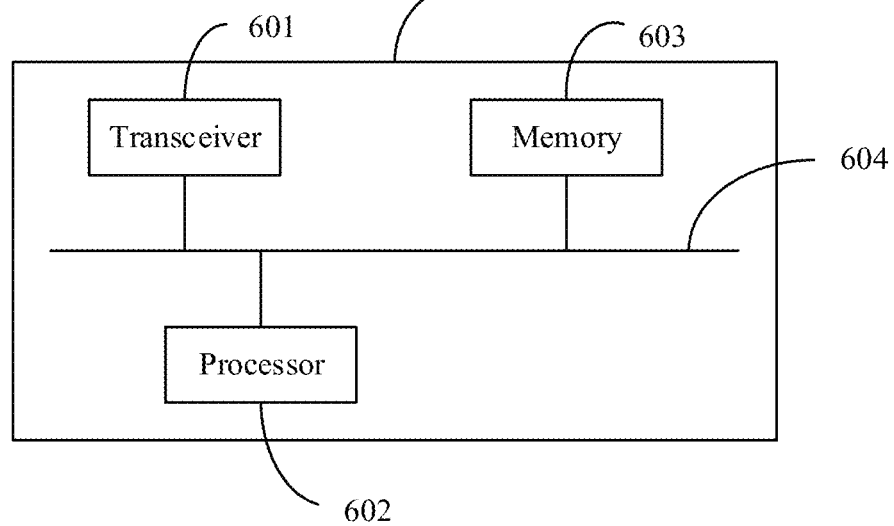
FIG. 10 is a simplified schematic diagram of a physical structure of a communications apparatus according to an embodiment of this application.

FIG. 10 is a simplified schematic diagram of a physical structure of a communications apparatus 60 according to an embodiment of this application. The communications apparatus 60 is a time-sensitive networking communications apparatus, and may be a policy control network element or an application function network element.

The communications apparatus 60 includes a transceiver 601, a processor 602, and a memory 603. The transceiver 601, the processor 602, and the memory 603 may be connected to each other using a bus 604, or may be connected to each other in another manner. A related function implemented by the transceiver unit 501 shown in FIG. 9 may be implemented by the transceiver 601. A related function implemented by the processing unit 502 shown in FIG. 9 may be implemented using one or more processors 602.

The memory 603 includes but is not limited to a random-access memory (RAM), a read-only memory (ROM), an erasable programmable read-only memory (EPROM), or a compact disc read-only memory (CD-ROM). The memory 603 is configured to store a related instruction and related data.

The transceiver 601 is configured to: send data and/or signaling, and receive data and/or signaling.

If the communications apparatus 60 is the PCF in the embodiments shown in FIG. 5 to FIG. 8A and FIG. 8B, the transceiver 601 may be configured to communicate with an SMF and an AF, for example, perform step S103 and step S107 in the embodiment shown in FIG. 5, perform step S207 and step S211 in the embodiment shown in FIG. 6A and FIG. 6B, perform step S305 and step S309 in the embodiment shown in FIG. 7A and FIG. 7B, and perform step S401*a*, step S403*a*, step S405*a*, step S406*a*, and step S407*a* in the embodiment shown in FIG. 8A and FIG. 8B.

If the communications apparatus 60 is the AF in the embodiments shown in FIG. 5 to FIG. 8A and FIG. 8B, the transceiver 601 may be configured to communicate with a PCF, an SMF, a UPF, and a CNC, for example, perform step S101 in the embodiment shown in FIG. 5, perform step S201 in the embodiment shown in FIG. 6A and FIG. 6B, perform step S301 in the embodiment shown in FIG. 7A and FIG. 7B, and perform step S402*a*, step S403*a*, step S407*a*, step S402*b*, step S404*b*, step S406*b*, step S402*c*, step S403*c*, step S405*c*, and step S406 in the embodiment shown in FIG. 8A and FIG. 8B.

The processor 602 may include one or more processors, for example, include one or more central processing units (CPUs). When the processor 602 is one CPU, the CPU may be a single-core CPU or a multi-core CPU.

If the communications apparatus 60 is the PCF in the embodiments shown in FIG. 5 to FIG. 8A and FIG. 8B, the processor 602 may be configured to perform an operation of controlling the PCF, for example, perform step S104 to step S106 in the embodiment shown in FIG. 5, perform step S208 to step S210 in the embodiment shown in FIG. 6A and FIG. 6B, perform step S306 to step S308 in the embodiment shown in FIG. 7A and FIG. 7B, and perform step S404*a* in the embodiment shown in FIG. 8A and FIG. 8B.

If the communications apparatus 60 is the AF in the embodiments shown in FIG. 5 to FIG. 8A and FIG. 8B, the processor 602 may be configured to perform an operation of controlling the AF, for example, perform step S102 in the embodiment shown in FIG. 5, perform step S202 in the embodiment shown in FIG. 6A and FIG. 6B, perform step S302 in the embodiment shown in FIG. 7A and FIG. 7B, and perform step S403*b* in the embodiment shown in FIG. 8A and FIG. 8B.

The memory 603 is configured to store program code and data of the communications apparatus 60.

For details of steps performed by the processor 602 and the transceiver 601, refer to the descriptions in the embodiments shown in FIG. 5 to FIG. 8A and FIG. 8B. Details are not described herein again.

It may be understood that FIG. 10 shows only a simplified design of the communications apparatus. In actual application, the communications apparatus may further include other necessary components, including but not limited to any quantity of transceivers, processors, controllers, memories, or communications units. All devices capable of implementing this application fall within the protection scope of this application.

An embodiment of this application further provides a time-sensitive networking communications system, and the system may include a policy control network element and an application function network element. The policy control network element and the application function network element may be configured to implement functions of the PCF and the AF in the embodiments shown in FIG. 5 to FIG. 8A and FIG. 8B. For details, refer to implementation processes of the PCF and the AF in FIG. 5 to FIG. 8A and FIG. 8B.

The time-sensitive networking communications system further includes a session management network element. The session management network element may be configured to implement functions of the SMF in the embodiments shown in FIG. 5 to FIG. 8A and FIG. 8B. For details, refer to implementation processes of the SMF in FIG. 5 to FIG. 8A and FIG. 8B.

The time-sensitive networking communications system further includes a user plane function network element. The user plane function network element may be configured to implement functions of the UPF in the embodiments shown in FIG. 5 to FIG. 8A and FIG. 8B. For details, refer to implementation processes of the UPF in FIG. 5 to FIG. 8A and FIG. 8B.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments may be performed. The foregoing storage medium includes any medium that can store program code, such as a ROM, a RAM, a magnetic disk, or an optical disc. Therefore, another embodiment of this application provides a computer-readable storage medium. The computer-readable storage medium stores an instruction. When the instruction is run on a computer, the computer is enabled to perform the methods in the foregoing aspects.

Another embodiment of this application further provides a computer program product including an instruction. When the computer program product is run on a computer, the computer is enabled to perform the methods in the foregoing aspects.

A person of ordinary skill in the art may be aware that, in combination with the examples described in the embodiments disclosed in this application, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted using a computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive or solid state disc (SSD)), or the like.

What is claimed is:

1. A method, comprising:
   receiving, by an application function network element from a time-sensitive networking (TSN) network element, forwarding policy information of TSN traffic, wherein the forwarding policy information comprises traffic information of the TSN traffic and an identifier of a port that transmits the TSN traffic;
   determining, by the application function network element based on the identifier of the port, a user terminal identifier corresponding to the TSN traffic; and
   sending, by the application function network element, the forwarding policy information and the user terminal identifier to a policy control network element.

2. The method of claim 1, wherein the forwarding policy information further comprises a virtual switching node identifier, and wherein the virtual switching node identifier identifies a virtual switching node corresponding to the identifier of the port.

3. The method of to claim 1, further comprising:
   receiving, by the application function network element from a session management network element, a virtual port identifier and a user terminal identifier corresponding to the virtual port identifier;
   recording a correspondence between the virtual port identifier and the user terminal identifier corresponding to the virtual port identifier; and
   determining, by the application function network element, the user terminal identifier corresponding to the TSN traffic based on the identifier of the port and the correspondence.

4. The method of claim 1, wherein the traffic information comprises a traffic class of the TSN traffic, and wherein the method further comprises determining, by the application function network element based on the traffic class, a $5^{th}$ generation (5G) quality of service (QoS) identifier (5QI) corresponding to the TSN traffic.

5. The method of claim 4, further comprising sending, by the application function network element, the 5QI to the policy control network element.

6. The method of to claim 1, wherein the identifier of the port comprises at least one of a first identifier of a first port that sends the TSN traffic or a second identifier of a second port that receives the TSN traffic.

7. The method of claim 6, wherein the second port is a user equipment (UE)-side virtual port and the first port is a user plane function (UPF)-side physical port.

8. The method of to claim 6, wherein the second port is a user plane function (UPF)-side physical port and the first port is a user equipment (UE)-side virtual port.

9. An apparatus, comprising:
one or more processors; and
a memory coupled to the one or more processors and configured to store program instructions which, when executed by the one or more processors, cause the apparatus to:
receive, from a time-sensitive networking (TSN) network element, forwarding policy information of TSN traffic, wherein the forwarding policy information of the TSN traffic comprises traffic information of the TSN traffic and an identifier of a port that transmits the TSN traffic;
determine, based on the identifier of the port, a user terminal identifier corresponding to the TSN traffic; and
send the forwarding policy information and the user terminal identifier to a policy control network element.

10. The apparatus of claim 9, wherein the forwarding policy information of the TSN traffic further comprises a virtual switching node identifier, and wherein the virtual switching node identifier identifies a virtual switching node corresponding to the identifier of the port that transmits the TSN traffic.

11. The apparatus of claim 9, wherein the program instructions further cause the apparatus to:
receive a virtual port identifier and a user terminal identifier corresponding to the virtual port identifier from a session management network element;
record a correspondence between the virtual port identifier and the user terminal identifier corresponding to the virtual port identifier; and
determine, based on the identifier of the port and the correspondence, the user terminal identifier corresponding to the TSN traffic.

12. The apparatus of claim 9, wherein the traffic information of the TSN traffic comprises a traffic class of the TSN traffic, and wherein the program instructions further cause the apparatus to determine, based on the traffic class of the TSN traffic, a $5^{th}$ generation (5G) quality of service (QoS) identifier (5QI) corresponding to the TSN traffic.

13. The apparatus of claim 12, wherein the program instructions further cause the apparatus to send the 5QI to the policy control network element.

14. The apparatus of claim 9, wherein the identifier of the port that transmits the TSN traffic comprises at least one of a first identifier of a first port that sends the TSN traffic or a second identifier of a second port that receives the TSN traffic.

15. The apparatus of claim 14, wherein the second port is a user equipment (UE)-side virtual port and the first port is a user plane function (UPF)-side physical port.

16. The apparatus of claim 14, wherein the second port is a user plane function (UPF)-side physical port and the first port is a user equipment (UE)-side virtual port.

17. A non-transitory computer-readable storage medium comprising instructions which, when executed by an apparatus, cause the apparatus to:
receive, from a time-sensitive networking (TSN) network element, forwarding policy information of TSN traffic, wherein the forwarding policy information comprises traffic information of the TSN traffic and an identifier of a port that transmits the TSN traffic;
determine, based on the identifier of the port, a user terminal identifier corresponding to the TSN traffic; and
send the forwarding policy information and the user terminal identifier to a policy control network element.

18. The non-transitory computer-readable storage medium of according to claim 17, wherein the instructions which, when executed by the apparatus, further cause the apparatus to:
receive a virtual port identifier and a user terminal identifier corresponding to the virtual port identifier from a session management network element;
record a correspondence between the virtual port identifier and the user terminal identifier corresponding to the virtual port identifier; and
determine, based on the identifier of the port and the correspondence, the user terminal identifier corresponding to the TSN traffic.

19. The non-transitory computer-readable storage medium of claim 17, wherein the traffic information of the TSN traffic comprises a traffic class of the TSN traffic, and wherein the instructions which, when executed by the apparatus, further cause the apparatus to determine, based on the traffic class of the TSN traffic, a $5^{th}$ generation (5G) quality of service (QoS) identifier (5QI) corresponding to the TSN traffic.

20. The non-transitory computer-readable storage medium of claim 17, wherein the identifier of the port comprises at least one of a first identifier of a first port that sends the TSN traffic or a second identifier of a second port that receives the TSN traffic.

\* \* \* \* \*